ated Aug. 6, 2013

(12) United States Patent
Tateishi

(10) Patent No.: US 8,500,897 B2
(45) Date of Patent: Aug. 6, 2013

(54) INK SET, RECORDED MATERIAL AND PRINTED MATERIAL

(75) Inventor: Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 202 days.

(21) Appl. No.: 13/142,030

(22) PCT Filed: Dec. 25, 2009

(86) PCT No.: PCT/JP2009/071911
§ 371 (c)(1),
(2), (4) Date: Jun. 25, 2011

(87) PCT Pub. No.: WO2010/074350
PCT Pub. Date: Jul. 1, 2010

(65) Prior Publication Data
US 2011/0300344 A1    Dec. 8, 2011

(30) Foreign Application Priority Data

Dec. 26, 2008 (JP) ................................ P2008-335174
Dec. 24, 2009 (JP) ................................ P2009-293568

(51) Int. Cl.
*C09D 11/02* (2006.01)

(52) U.S. Cl.
USPC .................. 106/31.78; 106/31.76; 106/31.77

(58) Field of Classification Search
USPC ................ 106/31.76, 31.77, 31.78; 427/256; 347/100; 428/195.1
See application file for complete search history.

(56) References Cited

U.S. PATENT DOCUMENTS 6,322,188 B1    11/2001  Sano
7,740,695 B2 *   6/2010  Kitamura et al. ......... 106/31.47

(Continued)

FOREIGN PATENT DOCUMENTS

CN    101096455 A    1/2008
JP    3455764 B2    8/2003

(Continued)

OTHER PUBLICATIONS

International Search Report (PCT/ISA/210) issued on Apr. 29, 2010 in the PCT Application No. PCT/JP2009/071911.

(Continued)

*Primary Examiner* — Helene Klemanski
(74) *Attorney, Agent, or Firm* — Sughrue Mion, PLLC

(57) ABSTRACT

An ink set is provided, the ink set including a yellow ink composition; and at least one of a magenta ink composition and a cyan ink composition, wherein a colorant of the yellow ink composition contains an azo pigment represented by formula (1), its tautomer, or a salt or hydrate thereof, the magenta ink composition contains at least one pigment selected from quinacridone pigments, and the cyan ink composition contains at least one pigment selected from phthalocyanine pigments:

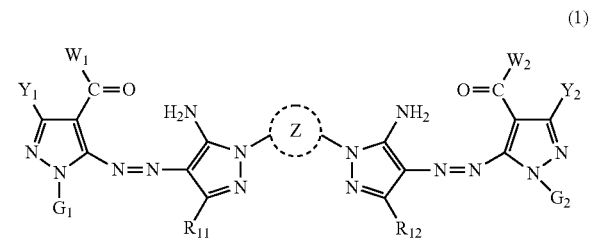

(1)

wherein Z represents atoms necessary to complete a 5- to 8-membered nitrogen-containing heterocycle; $Y_1$, $Y_2$, $R_{11}$ and $R_{12}$ each represents a hydrogen or a substituent; $G_1$ and $G_2$ each represents a hydrogen, an alkyl group, an aralkyl group, an alkenyl group, an alkynyl group, an aryl group or a heterocyclic group; and $W_1$ and $W_2$ each represents an alkoxy group, an amino group, an alkyl group or an aryl group.

20 Claims, 1 Drawing Sheet

(56) References Cited

U.S. PATENT DOCUMENTS

| | | | |
|---|---|---|---|
| 8,062,383 B2 * | 11/2011 | Tateishi | 8/637.1 |
| 8,080,067 B2 * | 12/2011 | Tateishi et al. | 8/637.1 |
| 8,101,011 B2 * | 1/2012 | Tateishi et al. | 106/31.46 |
| 8,172,910 B2 * | 5/2012 | Tateishi et al. | 8/637.1 |
| 8,222,326 B2 * | 7/2012 | Morimoto et al. | 524/88 |
| 8,236,065 B2 * | 8/2012 | Tateishi et al. | 8/637.1 |
| 8,328,344 B2 * | 12/2012 | Yamamoto et al. | 347/100 |
| 8,372,190 B2 * | 2/2013 | Tateishi et al. | 106/31.5 |
| 2006/0170745 A1 | 8/2006 | Deroover et al. | |
| 2007/0266890 A1 | 11/2007 | Taguchi et al. | |
| 2008/0012929 A1 | 1/2008 | Fujie et al. | |
| 2008/0274283 A1 | 11/2008 | Tateishi et al. | |
| 2010/0075040 A1 | 3/2010 | Tateishi et al. | |
| 2010/0231663 A1 | 9/2010 | Takasaki | |
| 2011/0091696 A1 * | 4/2011 | Tanaka et al. | 428/195.1 |
| 2011/0104458 A1 * | 5/2011 | Tanaka et al. | 428/195.1 |
| 2012/0088910 A1 | 4/2012 | Tateishi et al. | |
| 2012/0095194 A1 | 4/2012 | Tateishi et al. | |
| 2012/0095195 A1 | 4/2012 | Tateishi et al. | |
| 2012/0156449 A1 * | 6/2012 | Tateishi et al. | 106/31.77 |

FOREIGN PATENT DOCUMENTS

| | | |
|---|---|---|
| JP | 3553581 B2 | 5/2004 |
| JP | 2005-314545 A | 11/2005 |
| JP | 3882418 B2 | 11/2006 |
| JP | 3911920 B2 | 2/2007 |
| JP | 2007-63520 A | 3/2007 |
| JP | 2007-191642 A | 8/2007 |
| JP | 2008-88346 A | 4/2008 |
| JP | 2008-266568 A | 11/2008 |

OTHER PUBLICATIONS

Written Opinion of the International Searching Authority (PCT/ISA/237) issued on Apr. 29, 2010 in the PCT Application No. PCT/JP2009/071911.

Office Action, dated Mar. 20, 2013, issued by the State Intellectual Property Office of P.R. China in counterpart Chinese Patent Application No. 200980152576.7.

* cited by examiner

INK SET, RECORDED MATERIAL AND PRINTED MATERIAL

TECHNICAL FIELD

The present invention relates to a novel ink set, a recorded material and a printed material.

BACKGROUND ART

In the case of forming a color image by using an ink composition, at least a yellow ink, a magenta ink and a cyan ink are generally used. There can be reproduced a color in the green region when mixing yellow and cyan colors, a color in the red region when mixing yellow and magenta colors, and a color in the blue region when mixing cyan and magenta colors. Accordingly, development of an ink set capable of successfully reproducing colors in these regions over a wide range has been long demanded.

Each ink must satisfy performances generally required of the ink composition. For example, it is demanded that a sharp image is obtained on a recording medium and the image is free from deterioration during storage for a long time. In particular, one of performances required of an image formed using the ink composition is light fastness.

In order to impart good light fastness, a pigment is generally used as the colorant in the ink composition. However, depending on the pigment selected, sufficiently high light fastness may not be imparted. Also, the pigment is inferior in the coloring power compared with a dye and moreover, the image obtained by printing on a recording medium may lack the sharpness.

In the case of a color image formed using plural ink compositions, if any color inferior in the light fastness is present, the hue of the image changes and the quality of the color image seriously deteriorates. Accordingly, more controlled light fastness is required of a color ink composition.

In recent years, an inkjet recording printer is widely spreading. The inkjet recording method is a printing method of flying an ink composition in the form of small droplets and attaching it onto a recording medium such as paper, thereby performing printing. This method is characterized in that a high-resolution and high-quality image can be printed at a high speed by a relatively inexpensive apparatus. In particular, thanks to the enhanced image quality, a color inkjet recording apparatus is used also as a photographic output machine and is utilized even as a digital printer, a plotter, a CAD output device or the like. In using the image printed by the inkjet recording printer, various forms may be considered. Above all, a photograph-grade print is possibly put as a display in a place where the print is exposed to fluorescent light or direct sunshine, for example, in outdoor conditions for a long period of time. Accordingly, light fastness is one of very important performances required of the image obtained by the inkjet recording method.

As regards the pigment-based ink set excellent in the color reproducibility and light fastness over a wide range, particularly, as for the yellow pigment ink satisfying both good hue and high light fastness, an ink satisfying the required performances in a high level is not present, and development of a yellow pigment ink has been long demanded.

At the formation of a color image, a yellow ink composition containing a yellow pigment is used for reproducing a color in the yellow region. Specific examples of the yellow pigment include C.I. (Colour Index International) Pigment Yellow 1, 2, 3, 12, 13, 14, 16, 17, 73, 74, 75, 83, 93, 95, 97, 98, 109, 110, 114, 120, 128, 129, 138, 139, 150, 151, 154, 155, 180, 185 and 213.

Also, it is disclosed in JP-A-2005-314545 (the term "JP-A" as used herein means an "unexamined published Japanese patent application") and Japanese Patent No. 3,911,920 that a plurality of yellow pigment compositions each combining the above-described yellow pigments are prepared so as to reproduce a color in the yellow region over a wide range.

The yellow ink composition with good color reproducibility containing two or more kinds of yellow pigments may realize color reproducibility in a wider range than is possible by an ink containing one kind of a pigment, but color reproducibility of the dark part in the yellow region is not so high. Also, mixing of pigment species having hue angles distant from each other has a prominent tendency to cause reduction in the secondary color saturation. For example, C.I. Pigment Yellow 110 is red-tinged and its use in an ink set has a drawback that the green color shows a low saturation.

Furthermore, it is required not only that a sharp image is obtained on a recording medium but also that the image does not deteriorate during storage for a long time (particularly, light fastness). In the case of forming a color image by using plural pigment ink compositions, if any color inferior in the light fastness is present, the hue of the image changes and the quality of the color image extremely deteriorates. For example, C.I. Pigment Yellow 74 has a relatively good hue but because of its extremely low light fastness, when used in an ink set, the hue of the image greatly changes in the yellow, red, green and gray parts, and the quality deterioration of a color image is a major problem to be solved.

On the other hand, in order to reproduce a color in the yellow region over a wide range, Japanese Patent No. 3,455,764 Japanese Patent No. 3,553,581 and Japanese Patent No. 3,882,418 disclose a method using an ink set where a low-brightness yellow ink called dark yellow is further equipped as a second ink composition, separately from a high-brightness yellow ink.

However, in the method using a second ink composition typified by dark yellow, the number of ink colors is increased to make the color preparation complicated and not only the cost tends to rise but also the improvement level fails in reaching the level sufficiently satisfying the required performances.

Furthermore, for the purpose of imparting light fastness and coloring power (saturation) to the yellow ink composition, JP-A-2008-266568 discloses a method using an ink set where one or more pigments selected from C.I. Pigment Yellow 155, 185 and 213 are contained as the yellow pigment.

However, this method does not reach the level sufficiently satisfying good hue, high light fastness and high coloring power.

SUMMARY OF INVENTION

An object of the present invention is to provide an ink set assured of color reproducibility and light fastness over a wide range (a yellow single color region and a mixed color region such as red and green) and excellent in the coloring power, and a recording method and a recorded material each using the same.

Under the above-described circumstances, the present inventors have made intensive studies, as a result, it has been found that both color reproducibility and light fastness can be satisfied by an ink set containing a yellow ink composition using an azo pigment having a specific structure and at least one of a magenta ink composition and a cyan ink composition each using a specific colorant. The present invention has been accomplished based on this finding.

That is, the present invention is as follows.

(1) An ink set, including:

a yellow ink composition containing a colorant; and at least one of a magenta ink composition and a cyan ink composition, wherein the colorant of the yellow ink composition contains an azo pigment represented by the following formula (1), a tautomer of the azo pigment, or a salt or hydrate thereof, the magenta ink composition contains at least one pigment selected from quinacridone pigments as a colorant, and the cyan ink composition contains at least one pigment selected from phthalocyanine pigments as a colorant:

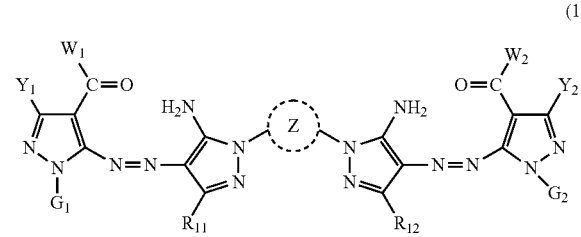

(1)

wherein Z represents atoms necessary to complete a 5- to 8-membered nitrogen-containing heterocycle;

$Y_1$, $Y_2$, $R_{11}$ and $R_{12}$ each independently represents a hydrogen or a substituent;

$G_1$ and $G_2$ each independently represents a hydrogen, an alkyl group, an aralkyl group, an alkenyl group, an alkynyl group, an aryl group or a heterocyclic group; and $W_1$ and $W_2$ each independently represents an alkoxy group, an amino group, an alkyl group or an aryl group.

(2) The ink set as described in (1) above, further comprising a black ink composition, wherein the black ink composition contains carbon black as a colorant.

(3) The ink set as described in (1) or (2) above, wherein each of $W_1$ and $W_2$ in formula (1) is independently an alkoxy group having a total carbon number of 3 or less, an amino group or an alkylamino group having a total carbon number of 3 or less.

(4) The ink set as described in any one of (1) to (3) above, wherein each of $G_1$ and $G_2$ in formula (1) is independently an alkyl group having a total carbon number of 3 or less.

(5) The ink set as described in any one of (1) to (4) above, wherein Z in formula (1) is a 6-membered nitrogen-containing heterocycle.

(6) The ink set as described in any one of (1) to (5) above, wherein the azo pigment represented by formula (1) is an azo pigment represented by the following formula (2):

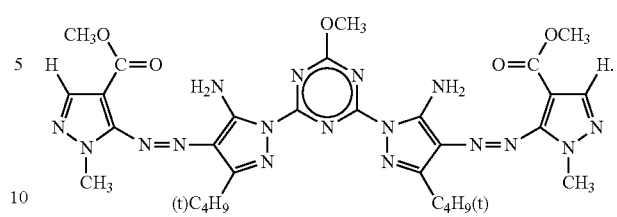

(2)

(7) The ink set as described in (6) above, wherein the azo pigment represented by formula (2) is an azo pigment showing characteristic X-ray diffraction peaks at Bragg angles (2θ±0.2°) of 7.2° and 25.9° in the CuKα characteristic X-ray diffraction.

(8) The ink set as described in any one of (1) to (5) above, wherein the azo pigment represented by formula (1) is an azo pigment represented by the following formula (3):

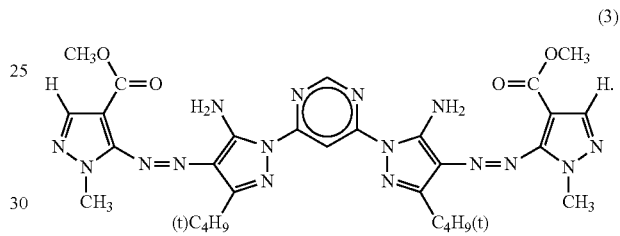

(3)

(9) The ink set as described in (8) above, wherein the azo pigment represented by formula (3) is an azo pigment showing characteristic X-ray diffraction peaks at Bragg angles (2θ±0.2°) of 7.6°, 25.6° and 27.7° in the CuKα characteristic X-ray diffraction.

(10) The ink set as described in any one of (1) to (9) above, wherein an additive amount of each of the colorants is from 1 to 8 mass % based on each of the ink compositions.

(11) The ink set as described in any one of (1) to (9) above, wherein an additive amount of the colorant of the yellow ink composition is from 3 to 6 mass % based on the yellow ink composition.

(12) The ink set as described in any one of (1) to (9) above, wherein an additive amount of the colorant of the magenta ink composition is from 3 to 6 mass % based on the magenta ink composition.

(13) The ink set as described in any one of (1) to (9) above, wherein an additive amount of the colorant of the cyan ink composition is from 3 to 6 mass % based on the cyan ink composition.

(14) The ink set as described in any one of (2) to (9) above, wherein an additive amount of the colorant of the black ink composition is from 1 to 3 mass % based on the black ink composition.

(15) The ink set as described in any one of (1) to (14) above, wherein the ink compositions contain at least one of a dispersant and a penetrant.

(16) The ink set as described in (15) above, wherein the dispersant is a high-molecular vinyl polymer particle.

(17) The ink set as described in (15) above, wherein the penetrant is at least one of lower alkyl ethers of a polyhydric alcohol and acetylene glycols.

(18) A recording method, including:
attaching an ink composition of the ink set as described in any one of (1) to (17) above on a recording medium to perform printing.
(19) The recording method as described in (18) above, which is an inkjet recording method, including:
ejecting a liquid droplet of the ink composition and attaching the liquid droplet on a recording medium to perform printing.
(20) A recorded material printed by the recording method as described in (18) or (19) above.

DESCRIPTION OF EMBODIMENTS

Figure 1:
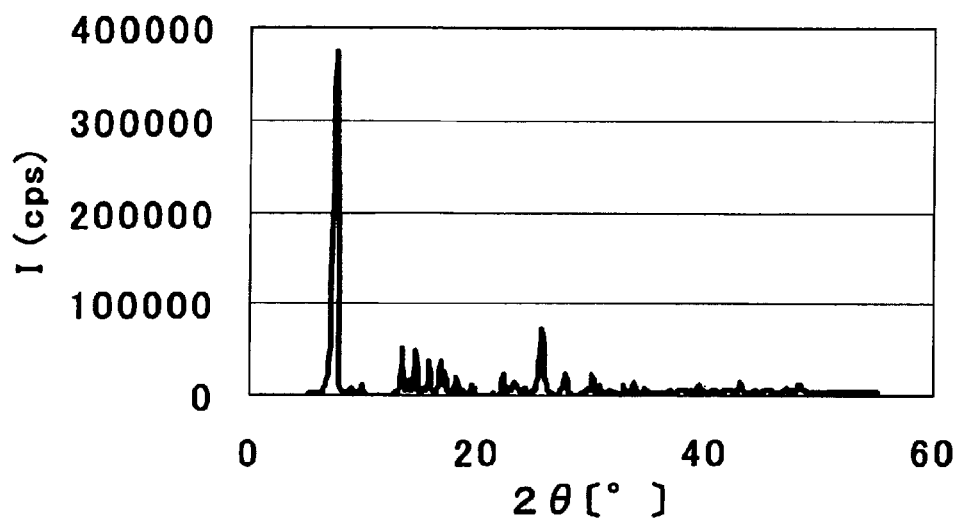
FIG. 1 is a CuKα characteristic X-ray diffraction diagram of the specific compound Pig. 1 synthesized in accordance with Synthesis Example 1.

The ink set of the present invention is used for a recording method using an ink composition. Examples of the recording method using an ink composition include an inkjet recording method, a recording method using a writing tool such as pen, and other various printing methods. In particular, the ink set of the present invention is preferably used for an inkjet recording method.

[Ink Set]

The ink set of the present invention is an ink set comprising a yellow ink composition and at least one of a magenta ink composition and a cyan ink composition, wherein
the colorant of the yellow ink composition contains an azo pigment represented by the following formula (1), its tautomer, or a salt or hydrate thereof,
the magenta ink composition contains, as the colorant, at least one pigment selected from quinacridone pigments (C.I. Pigment violet 19, C.I. Pigment Red 122), and
the cyan ink composition contains, as the colorant, at least one pigment selected from phthalocyanine pigments (C.I. Pigment Blue 15:3, C.I. Pigment Blue 15:4):

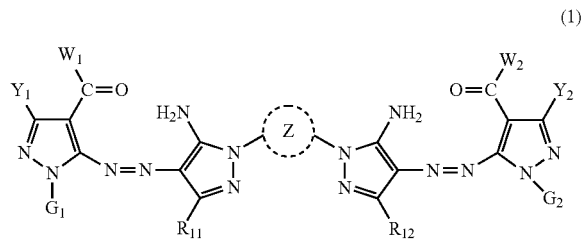

(1)

wherein Z represents atoms necessary to complete a 5- to 8-membered nitrogen-containing heterocycle, $Y_1$, $Y_2$, $R_{11}$ and $R_{12}$ each independently represents a hydrogen or a substituent, $G_1$ and $G_2$ each independently represents a hydrogen, an alkyl group, an aralkyl group, an alkenyl group, an alkynyl group, an aryl group or a heterocyclic group, and $W_1$ and $W_2$ each independently represents an alkoxy group, an amino group, an alkyl group or an aryl group.

The ink set preferably comprises a black ink composition, where the black ink composition contains carbon black (C.I. Pigment Black 7) as the colorant.

An image is formed by combining these pigment-containing ink compositions, and an image excellent in the color reproducibility can be thereby realized. The pigment above has high light fastness by itself and therefore, the image obtained is excellent in the fastness.

Z represents atoms necessary to complete a divalent 5- to 8-membered nitrogen-containing heterocycle, and preferred examples of the heterocyclic group, without limiting the substitution position, a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring and a pyrazine ring. The heterocycle is more preferably a 6-membered nitrogen-containing heterocycle, and examples thereof include a pyridine ring, a pyrimidine ring and an S-triazine ring. Z is preferably a pyrimidine ring. In the case where Z is a 6-membered nitrogen-containing heterocycle, this is preferred also in view of hydrogen bondability and molecular planarity, because the intramolecular or intermolecular activity of a colorant t molecule is liable to be more enhanced.

In formula (1), $W_1$ and $W_2$ each independently represents an alkoxy group, an amino group, an alkyl group or an aryl group The alkoxy group represented by $W_1$ and $W_2$ is preferably a substituted or unsubstituted alkoxy group having a carbon number of 1 to 30, and examples thereof include a methoxy group, an ethoxy group, an isopropoxy group, a tert-butoxy group, an n-octyloxy group and a 2-methoxyethoxy group.

The amino group represented by $W_1$ and $W_2$ includes an alkylamino group, an arylamino group and a heterocyclic amino group and is preferably an amino group, a substituted or unsubstituted alkylamino group having a carbon number of 1 to 30, or a substituted or unsubstituted anilino group having a carbon number of 6 to 30, and examples thereof include a methylamino group, a dimethylamino group, an anilino group, an N-methyl-anilino group and a diphenylamino group.

The alkyl group represented by $W_1$ and $W_2$ includes a linear, branched or cyclic, substituted or unsubstituted alkyl group and includes, for example, a cycloalkyl group, a bicycloalkyl group and even a tricyclo structure having many ring structures. The alkyl group in the substituents described below (for example, an alkyl group in the alkoxy group or alkylthio group) indicates an alkyl group having such a concept. More specifically, the alkyl group is preferably an alkyl group having a carbon number of 1 to 30, such as methyl group, ethyl group, n-propyl group, isopropyl group, tert-butyl group, n-octyl group, eicosyl group, 2-chloroethyl group, 2-cyanoethyl group and 2-ethylhexyl group; the cycloalkyl group is preferably a substituted or unsubstituted cycloalkyl group having a carbon number of 3 to 30, such as cyclohexyl group, cyclopentyl group and 4-n-dodecylcyclohexyl group; and the bicycloalkyl group is preferably a substituted or unsubstituted bicycloalkyl group having a carbon number of 5 to 30, that is, a monovalent group after removing one hydrogen from a bicycloalkane having a carbon number of 5 to 30, such as bicyclo[1,2,2]heptan-2-yl group and bicyclo[2,2,2]octan-3-yl.

The aryl group represented by $W_1$ and $W_2$ is preferably a substituted or unsubstituted aryl group having a carbon number of 6 to 30, such as phenyl group, p-tolyl group, naphthyl group, m-chlorophenyl group and o-hexadecanoylaminophenyl group.

Above all, $W_1$ and $W_2$ each is preferably an alkoxy group, an amino group or an alkyl group, more preferably an alkoxy group or an amino group, still more preferably an alkoxy group having a total carbon number of 5 or less, an amino group (—$NH_2$ group) or an alkylamino group having a total carbon number of 5 or less, yet still more preferably an amino group (—$NH_2$ group), an alkoxy group having a total carbon number of 3 or less (e.g., methoxy group, ethoxy group) or an alkylamino group having a total carbon number of 3 or less (e.g., —$NHCH_3$ group, —$N(CH_3)_2$ group), and most preferably a methoxy group (—$OCH_3$ group). In the case where $W_1$ or $W_2$ is an alkoxy group having a total carbon number of 5 or less, an amino group or an alkylamino group having a total carbon number of 5 or less, this is preferred in view of good hue and high fatness (fastness to light, gas, heat, water and chemicals), because a colorant molecule readily produces a strong interaction within a molecule as well as between molecules and a pigment having a more stable molecular arrangement is readily composed. A methoxy group, an ethoxy group and an amino group are more preferred in view of hue, light fastness and solvent resistance, and a methoxy group is most preferred in view of good hue and enhanced light fastness.

In formula (1), $R_{11}$ and $R_{12}$ each independently represents a hydrogen or a substituent and when $R_{11}$ and $R_{12}$ each represents a substituent, examples of the substituent include a linear or branched alkyl group having a carbon number of 1 to 12, a linear or branched aralkyl group having a carbon number of 7 to 18, a linear or branched alkenyl group having a carbon number of 2 to 12, a linear or branched alkynyl group having a carbon number of 2 to 12, a cycloalkyl group having a carbon number of 3 to 12, a cycloalkenyl group having a carbon number of 3 to 12 (examples of these groups include methyl, ethyl, n-propyl, i-propyl, n-butyl, i-butyl, sec-butyl, tert-butyl, 2-ethylhexyl, 2-methylsulfonylethyl, 3-phenoxypropyl, trifluoromethyl and cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenyloxy), an acylamino group (e.g., acetamide, benzamide, 4-(3-tert-butyl-4-hydroxyphenoxy)butanamide), an alkylamino group (e.g., methylamino, butylamino, diethylamino, methylbutylamino), an arylamino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), alkylsulfonylamino and arylsulfonylamino groups (e.g., methylsulfonylamino, phenylsulfonylamino, p-toluenesulfonylamino), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methylsulfonyl, octylsulfonyl, phenylsulfonyl, p-toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imide group (e.g., N-succinimide, N-phthalimide), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl group, sulfo group, phosphono group, quaternary ammonium group).

In formula (1), $R_{11}$ and $R_{12}$ each is preferably a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, more preferably a linear or branched alkyl group having a total carbon number of 1 to 8, still more preferably a methyl group, an i-propyl group or a tert-butyl group, yet still more preferably an i-propyl group or a tert-butyl group, and most preferably a tert-butyl group.

When $R_{11}$ and $R_{12}$ each is a linear or branched alkyl group having a small total carbon number (of 1 to 4), this is preferred in view of enhancing the hue, coloring power and image fastness, because the pigment molecular arrangement becomes easy to sterically control (arrange at a constant distance/angle) and in turn, a pigment particle having a stable intramolecular/intermolecular interaction is readily formed.

In formula (1), Z represents atoms necessary to complete a 5- to 8-membered nitrogen-containing heterocycle, and the rings may be further condensed. Z is preferably a 5- to 8-membered heterocyclic group, more preferably a 5- or 6-membered substituted or unsubstituted heterocyclic group, still more preferably a 6-membered nitrogen-containing heterocyclic group having a carbon number of 3 to 10.

Examples of the heterocyclic group include, without limiting the substitution position, pyridyl, pyrazinyl, pyridazinyl, pyrimidyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl and sulforanyl.

Preferred examples of the heterocycle include a pyridine ring, a pyrimidine ring, an S-triazine ring, a pyridazine ring, a pyrazine ring, a 1,2,4-thiadiazole ring, a 1,3,4-thiadiazole ring and an imidazole ring. Of these, a pyridine ring, a pyrimidine ring, an S-triazine ring, a pyridazine ring and a pyrazine ring are more preferred, a pyrimidine ring and an S-triazine ring are still more preferred in view of hue, coloring power and image fastness, a pyrimidine ring having a substituent at the 4- and 6-positions and an S-triazine ring having an alkoxy group having a carbon number of 1 to 4 at the 2-position are yet still more preferred in view of hue and image fastness, and a pyrimidine ring having a substituent at the 4- and 6-positions is most preferred in view of good hue and enhanced light fastness.

$G_1$ and $G_2$ each independently represents a hydrogen, an alkyl group, an aralkyl group, an alkenyl group, an alkynyl group, an aryl group or a heterocyclic group and is preferably a hydrogen, a methyl group, an ethyl group, an n-propyl group, an isopropyl group, a tert-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group or a pyrazinyl group, more preferably a hydrogen, a methyl group, a phenyl group, a pyridyl group, a pyrimidinyl group or a pyrazinyl group, still more preferably a linear or branched alkyl group having a total carbon number of 1 to 8, a 2-pyridyl group, a 2,6-pyrimidinyl group or a 2,5-pyrazinyl group, yet still more preferably an alkyl group having a total carbon number of 3 or less in view of hue and image fastness, and most preferably a methyl group in view of good hue and enhanced light fastness.

In the case where $Y_1$ and $Y_2$ each represents a substituent, examples of the substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group and a silyl group.

$Y_1$ or $Y_2$ is preferably, for example, a hydrogen, an alkyl group (e.g., methyl), an aryl group (e.g., phenyl), a heterocyclic group (e.g., 2-pyridyl) or an alkylthio group (e.g., methylthio), more preferably a hydrogen, a linear or branched alkyl group having a total carbon number of 1 to 4, a phenyl group or a methylthio group, still more preferably a hydrogen or a methyl group in view of hue and image fastness, and most preferably a hydrogen in view of good hue and enhanced light fastness.

As for the preferred combination of substituents of the pigment represented by formula (1) of the present invention, a compound where at least one of various substituents is the above-described preferred group is preferred, a compound where a larger number of various substituents are the above-described preferred group is more preferred, and a compound where all substituents are the above-described preferred group is most preferred.

The particularly preferred combination as the azo pigment represented by formula (1) of the present invention is a combination covering the following (i) to (v).

(i) Z is preferably a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring or a pyrazine ring. Z is more preferably a 6-membered nitrogen-containing heterocycle, such as pyridine ring, pyrimidine ring and S-triazine ring, still more preferably a pyrimidine ring or an S-triazine ring, yet still more preferably a pyrimidine ring having a substituent at the 4- and 6-positions or an S-triazine ring having an alkoxy group having a carbon number of 1 to 4 at the 2-position, and most preferably a pyrimidine ring having a substituent at the 4- and 6-positions.

(ii) $W_1$ and $W_2$ each is preferably an alkoxy group (e.g., methoxy group, ethoxy group, isopropoxy group, tert-butoxy group), an amino group (e.g., —$NH_2$ group, methylamino group, dimethylamino group, anilino group), an alkyl group (e.g., methyl group, ethyl group, n-propyl group, isopropyl group, tert-butyl group, cyclopropyl group) or an aryl group (e.g., phenyl group, p-tolyl group, naphthyl group), more preferably an alkoxy group, an amino group or an alkyl group, still more preferably an alkoxy group or an amino group, yet still more preferably an alkoxy group having a total carbon number of 5 or less, an amino group (—$NH_2$ group) or an alkylamino group having a total carbon number of 5 or less, even yet still more preferably an alkoxy group having a total carbon number of 3 or less (e.g., methoxy group, ethoxy group) or an alkylamino group having a total carbon number of 3 or less (e.g., —$NHCH_3$ group, —$N(CH_3)_2$ group), and most preferably a methoxy group (—$OCH_3$ group).

(iii) $R_{11}$ and $R_{12}$ each is independently preferably a hydrogen or a substituent (for example, a substituted or unsubstituted acylamino group having a total carbon number of 1 to 8, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12), more preferably a linear or branched alkyl group having a total carbon number of 1 to 8, still more preferably a methyl group, an i-propyl group or a tert-butyl group, yet still more preferably an i-propyl group or a tert-butyl group, and most preferably a tert-butyl group.

(iv) $G_1$ and $G_2$ each represents a hydrogen, an alkyl group, a cycloalkyl group, an aralkyl group, an alkenyl group, an alkynyl group, an aryl group or a heterocyclic group and is preferably a hydrogen, a methyl group, an ethyl group, an n-propyl group, an isopropyl group, a tert-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group or a pyrazinyl group, more preferably a hydrogen, a methyl group, a phenyl group, a pyridyl group, a pyrimidinyl group or a pyrazinyl group, still more preferably a linear or branched alkyl group having a total carbon number of 1 to 8, a 2-pyridyl group, a 2,6-pyrimidinyl group or a 2,5-pyrazinyl group, yet still more preferably an alkyl group having a total carbon number of 3 or less, and most preferably a methyl group.

(v) $Y_1$ and $Y_2$ each is preferably a hydrogen, an alkyl group (e.g., methyl), an aryl group (e.g., phenyl), a heterocyclic group (e.g., 2-pyridyl) or an alkylthio group (e.g., methylthio), more preferably a hydrogen, a linear or branched alkyl group having a total carbon number of 1 to 4, a phenyl group or a methylthio group, still more preferably a hydrogen or a methyl group, and most preferably a hydrogen.

In the present invention, the azo pigment represented by formula (1) is preferably an azo pigment represented by the following formula (2):

(2):

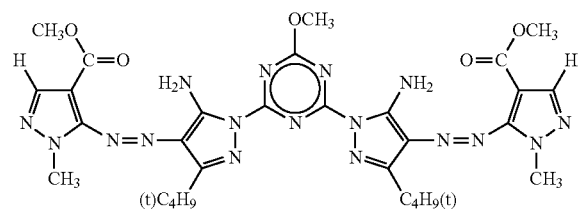

The azo pigment represented by formula (2) is preferably an azo pigment having characteristic X-ray diffraction peaks at Bragg angles (2θ±0.2°) of 7.2° and 25.9° in the CuKα characteristic X-ray diffraction, or its tautomer.

By virtue of using an azo pigment represented by formula (2), good absorption property and high coloring power can be imparted at the same time.

In the case of a single crystalline morphology, a dense state is produced between molecules and the intermolecular interaction is intensified. As a result, solvent resistance, heat stability, light fastness, gas resistance and printing density are enhanced, and the color reproduction region is more broadened. Therefore, the azo pigment represented by formula (2) or its tautomer preferably has a crystalline morphology with characteristic X-ray diffraction peaks at Bragg angles (2θ±0.2°) of 7.2° and 25.9°, more preferably a crystalline morphology with characteristic X-ray diffraction peaks at 7.2°, 15.0°, 19.8° and 25.9°, still more preferably a crystalline morphology with characteristic X-ray diffraction peaks at 7.2°, 8.2°, 10.0°, 13.4°, 15.0°, 19.8° and 25.9°, in the CuKα characteristic X-ray diffraction.

In the present invention, the azo pigment represented by formula (1) is preferably an azo pigment represented by the following formula (3):

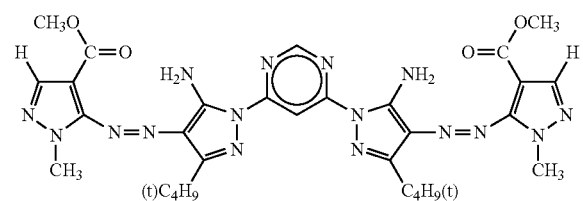

The azo pigment represented by formula (3) is preferably an azo pigment having characteristic X-ray diffraction peaks at Bragg angles (2θ±0.2°) of 7.6°, 25.6° and 27.7° in the CuKα characteristic X-ray diffraction, or its tautomer.

By virtue of using the azo pigment represented by formula (3), good hue and high image fastness can be imparted at the same time.

The azo pigment represented by formula (3) or its tautomer preferably has a crystalline morphology with characteristic X-ray diffraction peaks at Bragg angles (2θ±0.2°) of 7.6°, 25.6° and 27.7°, more preferably a crystalline morphology with characteristic X-ray diffraction peaks at 7.6°, 13.5°, 25.6° and 27.7°, still more preferably a crystalline morphology with characteristic X-ray diffraction peaks at 7.6°, 13.5°, 15.9°, 16.9°, 25.6° and 27.7°, in the CuKα characteristic X-ray diffraction.

In the present invention, the X-ray diffraction of an azo pigment having a crystalline morphology represented by formula (2) or (3) can be measured in accordance with Japanese Industrial Standards JIS K0131 (X-ray diffraction analysis rules) by using a powder X-ray diffraction measuring apparatus RINT 2500 (manufactured by Rigaku Corporation).

When the primary particle of the azo pigments represented by formulae (2) and (3) is observed by a transmission microscope, the length in the long axis direction is preferably from 0.01 to 30 μm, more preferably from 0.02 to 10 μm, and most preferably from 0.03 to 1 μm.

In the case where the length in the long axis direction of a primary particle observed by a transmission microscope is 0.01 μm or more, fastness to light or ozone and dispersibility in forming a pigment dispersion can be more unfailingly ensured, whereas in the case of 30 μm or less, the pigment when dispersed into a desired volume average particle diameter is hardly over-dispersed (a state where a primary particle is broken), an active surface is scarcely exposed to the pigment particle surface, aggregation is thereby difficult to occur, and storage stability of the pigment dispersion can be more unfailingly ensured.

The length in the long axis direction of the primary particle is preferably in the range above, because the pigment exhibits high fastness to light or ozone and its pigment dispersion is advantageously assured of excellent storage stability.

Specific examples of the azo pigment represented by formula (1) are set forth below, but the azo compound of the azo pigment for use in the present invention is not limited to these examples. In the following specific examples, the structure is shown in the form of a canonical structural formula out of several kinds of tautomers that are possible in view of chemical structure, but the compound may of course have a tautomeric structure other than the structures shown below.

Pig. - 1

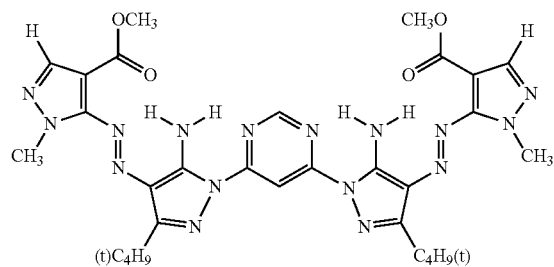

Pig. - 2

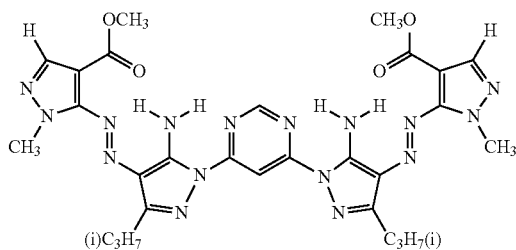

Pig. - 3

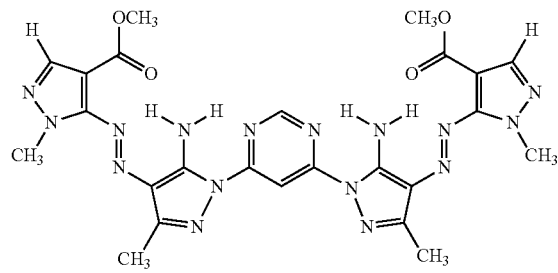

Pig. - 4

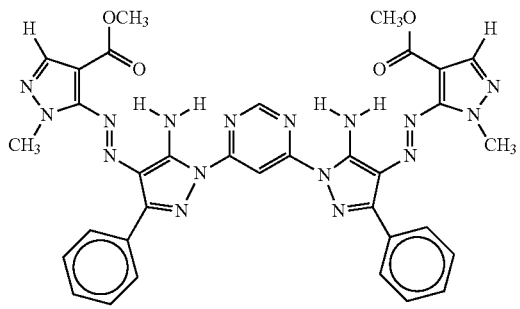

-continued

-continued

-continued

-continued

Pig. - 41

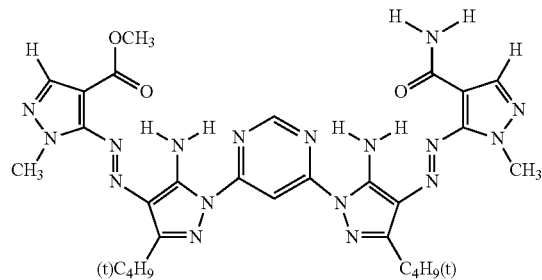

Pig. - 42

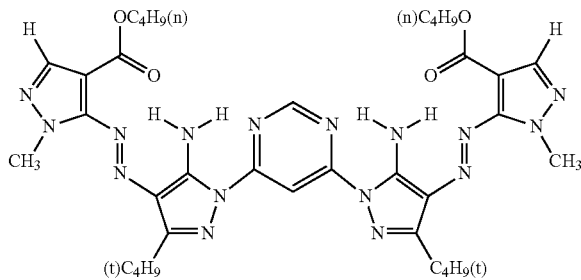

Pig. - 43

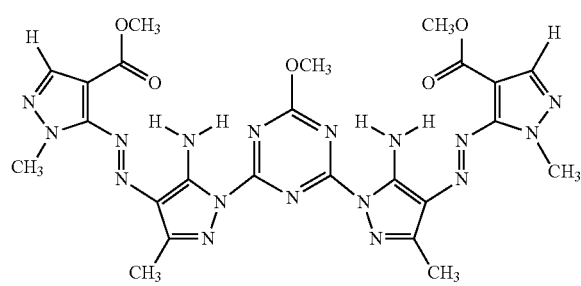

Pig. - 44

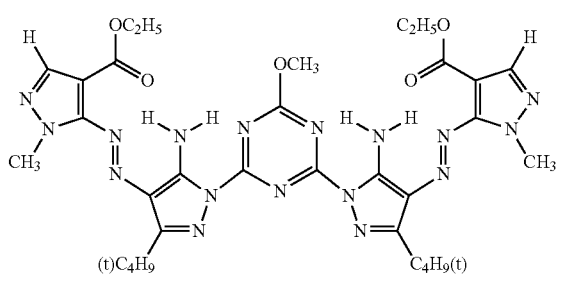

Pig. - 45

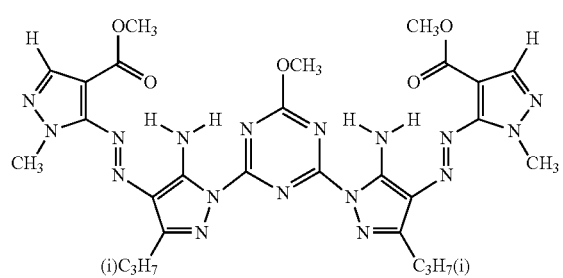

Pig. - 46

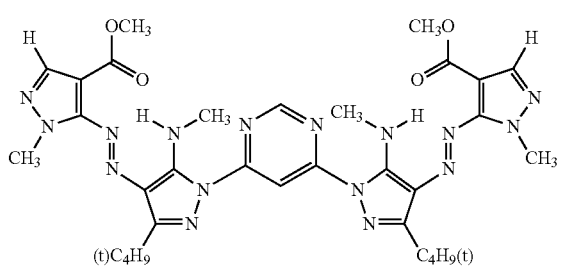

Pig. - 47

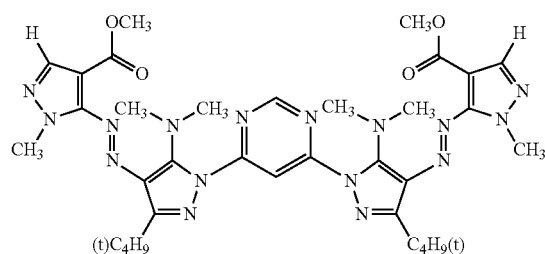

Pig. - 48

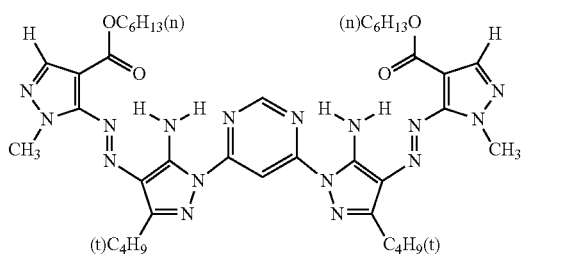

The azo pigment represented by formula (1) has many tautomers.

In the present invention, the azo pigment represented by formula (1) preferably has substituents capable of forming an intramolecular hydrogen bond or an intramolecular crossover hydrogen bond. An azo pigment having substituents capable of forming at least one or more intramolecular crossover hydrogen bonds is preferred, an azo pigment having substituents capable of forming at least three or more intramolecular hydrogen bonds is more preferred, and an azo pigment having substituents capable of forming at least three or more intramolecular hydrogen bonds, with at least two of these hydrogen bonds forming an intramolecular crossover hydrogen bond, is still more preferred.

The pigment represented by formula (1) for use in the present invention may be sufficient if it is a pigment having a chemical structural formula of formula (1) or its tautomer, and a pigment in any crystalline morphology called polymorphism may be used.

The crystalline polymorphism means that the chemical composition is the same but the arrangement of building blocks (molecules or ions) in the crystal differs. The chemical and physical properties are determined by the crystal structure, and each polymorphic form can be distinguished by the rheology, color and other color characteristics. Also, different polymorphic forms can be confirmed by X-ray diffraction (powder X-ray diffraction measurement results) or X-ray analysis (X-ray crystal structure analysis results).

In the case where a polymorphic crystalline form is present in the pigment represented by formulae (1) to (4) of the present invention, the pigment may have any polymorphic form or may have a mixture of two or more kinds of polymorphic forms, but the main component preferably has a single crystalline form, that is, a polymorphic crystalline form is preferably not mixed in the main component, and the content of an azo component having a single crystalline form is from 70 to 100%, preferably from 80 to 100%, more preferably from 90 to 100%, still more preferably from 95 to 100%, yet still more preferably 100%, based on the entire azo pigment. By using as the main component an azo pigment having a single crystalline form, regularity with respect to the arrangement of colorant molecules is enhanced, the intramolecular/intermolecular interaction is intensified, a high-order three-dimensional network is readily formed, and this is preferred in view of performances required of the pigment, such as enhanced hue; fastness to light, heat, humidity or oxidative gas; and solvent resistance.

The ratio of the polymorphic crystalline form mixed in the azo pigment can be confirmed by values obtained in physicochemical measurement of a solid, such as single-crystal X-ray crystal structure analysis; powder X-ray diffraction (XRD); micrograph of crystal (TEM); and IR, infrared spectroscopy, (KBr method).

In the present invention, in the case where the azo pigment represented by formula (1) has an acid radical, the acid radical may be partially or entirely salt-type, or a salt-type pigment and a free acid-type pigment may coexist. Examples of the salt type include a salt of an alkali metal such as Na, Li and K, a salt of an alkaline earth metal such as Mg, Ca and Ba, a salt of an ammonium which may be substituted by an alkyl group or a hydroxyalkyl group, and a salt of an organic amine. Examples of the organic amine include a lower alkylamine, a hydroxy-substituted lower alkylamine, a carboxy-substituted lower alkylamine, and a polyamine having from 2 to 10 alkylene imine units having a carbon number of 2 to 4. The salt type is not limited only to one kind, but a plurality of kinds may also be present together.

In the structure of the pigment for use in the present invention, when plural acid radicals are contained in one molecule, the plural acid radicals may be salt-type or acid-type and may be different from each other.

In the present invention, the azo pigment represented by formula (1) may be a hydrate containing a water molecule in the crystal.

One example of the production method for the azo pigment represented by formula (1) is described below. For example, a heterocyclic amine represented by the following formula (A) is converted into a diazonium form under acidic conditions, caused to undergo a coupling reaction with a compound represented by the following formula (B) and then subjected to a post-treatment in an ordinary manner, whereby the azo pigment represented by formula (1) can be produced.

Formula (A):

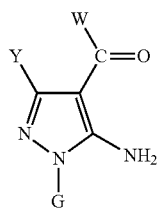

-continued

Formula (B):

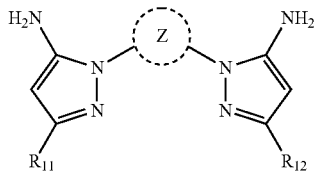

In formulae (A) and (B), W, Y, G, $R_{11}$, $R_{12}$ and Z have the same meanings as W ($W_1$ or $W_2$), Y ($Y_1$ or $Y_2$), G ($G_1$ or $G_2$), $R_{11}$, $R_{12}$ and Z in formula (1).

The heterocyclic amine represented by formula (A) can be produced generally by a commonly employed method, for example, by a method described in Helv. Chim. Acta., 41, 1052-1056, 1958, and Helv. Chim. Acta., 42, 349-352, 1959, or in accordance therewith.

The compound represented by formula (B) can be produced by a method described in International Publication No. 06/082669 or JP-A-2006-57076 or in accordance therewith.

(Preparation Step of Diazonium Salt of Heterocyclic Amine]

Preparation of a Diazonium Salt of the Heterocyclic Amine Represented by formula (A) (diazo component) and coupling reaction of the diazonium salt with the compound represented by formula (B) (coupling component) can be performed by a conventional method.

As for the preparation of a diazonium salt of the heterocyclic amine represented by formula (A), there may be applied, for example, a conventional method of preparing a diazonium salt by using a nitrosonium ion source such as nitrous acid, nitrite or nitrosyl sulfuric acid, in a reaction medium containing an acid (e.g., hydrochloric acid, sulfuric acid, phosphoric acid, acetic acid, propionic acid, methanesulfonic acid, trifluoromethanesulfonic acid).

Preferred examples of the acid include acetic acid, propionic acid, methanesulfonic acid, phosphoric acid and sulfuric acid which are used individually or in combination. Among these, a combination system of phosphoric acid or acetic acid with sulfuric acid, a combination system of acetic acid with propionic acid, and a combination system of acetic acid with propionic acid and sulfuric acid are more preferred, and a combination system of acetic acid with propionic acid, and a combination system of acetic acid with propionic acid and sulfuric acid are still more preferred.

Preferred examples of the reaction medium (solvent) include an organic acid and an inorganic acid. Among these, phosphoric acid, sulfuric acid, acetic acid, propionic acid and methanesulfonic acid are preferred, and acetic acid and/or propionic acid are more preferred.

Preferred examples of the nitrosonium ion source include nitrous acid esters, nitrites and nitrosyl sulfuric acid. Among these, sodium nitrite, potassium nitrite, isoamyl nitrite, nitrosyl sulfuric acid (for example, an $ONHSO_4$ sulfuric acid solution) are preferred, and isoamyl nitride and nitrosyl sulfuric acid (for example, a sulfuric acid solution containing from 40 to 50 mass % of $ONHSO_4$) are more preferred. Above all, when nitrosyl sulfuric acid is used in the above-described preferred acid-containing reaction medium, a diazonium salt can be stably and effectively prepared.

The amount of the solvent used is preferably from 0.5 to 50 times by mass, more preferably from 1 to 20 times by mass, still more preferably from 3 to 15 times by mass, based on the diazo component of formula (A).

In the present invention, the diazo component of formula (A) may be in state of being dispersed in a solvent or depending on the kind of the diazo component, may be in a solution state.

The amount of the nitrosonium ion source used is preferably from 0.95 to 5.0 equivalent, more preferably from 1.00 to 3.00 equivalent, still more preferably from 1.00 to 1.10 equivalent, based on the diazo component.

The reaction temperature is preferably from −15° C. to 40° C., more preferably from −5° C. to 35° C., still more preferably from −0° C. to 30° C. If the reaction temperature is less than −10° C., the reaction proceeds at an extremely slow rate and the synthesis uneconomically takes so much time, whereas if the synthesis is performed at a high temperature exceeding 40° C., the amount of a by-product produced increases and this is not preferred.

The reaction time is preferably from 30 to 300 minutes, more preferably from 30 to 200 minutes, still more preferably from 30 to 150 minutes.

[Coupling Reaction Step]

The coupling reaction may be performed in from an acidic reaction medium to a basic reaction medium but in the case of the azo pigment of the present invention, the coupling reaction is preferably performed in from an acidic reaction medium to a neutral reaction medium. In particular, when the coupling reaction is performed in an acidic reaction medium, an azo pigment can be effectively derived by suppressing the decomposition of the diazonium salt.

Preferred examples of the reaction medium (solvent) which can be used include an organic acid, an inorganic acid and an organic solvent, with an organic solvent being preferred. A solvent causing no liquid separation phenomenon during the reaction and providing a uniform solution with the solvent is preferred. Examples thereof include an alcoholic organic solvent such as methanol, ethanol, propanol, isopropanol, butanol, tert-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, a tetrahydrofuran, a dioxane and an acetonitrile. The solvent may be a mixed solution of two or more kinds of these solvents.

An organic solvent having a polarity parameter (ET) value of 40 or more is preferred. Above all, the solvent is preferably a glycol-based solvent having two or more hydroxyl groups in the solvent molecule, an alcoholic solvent having a carbon number of 3 or less, or a ketone-based solvent having a total carbon number of 5 or less, more preferably an alcohol solvent having a carbon number of 2 or less (e.g., methanol, ethylene glycol), or a ketone-based solvent having a total carbon number of 4 or less (e.g., acetone, methyl ethyl ketone). A mixed solvent thereof may also be used.

The amount of the solvent used is preferably from 1 to 100 times by mass, more preferably from 1 to 50 times by mass, still more preferably from 2 to 30 times by mass, based on the coupling component represented by formula (B).

In the present invention, the coupling component represented by formula (B) may be in a state of being dispersed in a solvent or depending on the kind of the coupling component, may be in a solution state.

The amount of the coupling component used is, in terms of the diazo component, preferably from 0.95 to 5.0 equivalent, more preferably from 1.00 to 3.00 equivalent, still more preferably from 1.00 to 1.50 equivalent, based on the azo coupling site.

The reaction temperature is preferably from −30° C. to 30° C., more preferably from −15° C. to 10° C., still more preferably from −10° C. to 5° C. If the reaction temperature is less than −30° C., the reaction proceeds at an extremely slow rate and the synthesis uneconomically takes so much time, whereas if the synthesis is performed at a high temperature exceeding 30° C., the amount of a by-product produced increases and this is not preferred.

The reaction time is preferably from 30 to 300 minutes, more preferably from 30 to 200 minutes, still more preferably from 30 to 150 minutes.

In the production method of the azo pigment composition for use in the present invention, the product (crude azo pigment) obtained through these reactions is usually treated according to a post-treatment method in the normal organic synthesis reaction and used after being or not being purified.

That is, for example, the reaction product isolated from the reaction system can be used without purification or can be used after performing purification operations such as recrystallization and salt formation, individually or in combination.

Also, after the completion of reaction, the reaction solvent is or is not removed by distillation, the reaction product is poured in water or ice, then is or is not neutralized, further is isolated or extracted with an organic solvent/an aqueous solution, and thereafter can be used without purification or can be used after performing purification operations such as recrystallization and salt formation, individually or in combination.

The production method of the azo pigment composition for use in the present invention is described in more detail below.

The production method of the azo pigment composition for use in the present invention is characterized in that in a coupling reaction between a diazonium compound obtained by converting a heterocyclic amine represented by formula (A) into a diazonium form and a compound represented by formula (B), the coupling reaction is performed after dissolving the compound represented by formula (B) in an organic solvent.

The reaction for preparing a diazonium salt of the heterocyclic amine represented by formula (A) may be performed, for example, by reacting the heterocyclic amine with a reagent such as sodium nitrite and nitrosyl sulfuric acid in an acidic solvent such as sulfuric acid, phosphoric acid and acetic acid at a temperature of 15° C. or less for approximately from 10 minutes to 6 hours. The coupling reaction is preferably performed by reacting the diazonium salt obtained by the method above with a compound represented by formula (B) at 40° C. or less, preferably 15° C. or less, for approximately from 10 minutes to 12 hours.

The above-described tautomer and/or polymorphic crystalline form can be controlled by the production conditions at the coupling reaction. As to the method for producing a pigment composition containing as the main component a crystal in a more preferred embodiment of the present invention, that is, a crystal of formula (2) having characteristic X-ray diffraction peaks at 7.2° and 25.9° or a crystal of formula (3) having characteristic X-ray diffraction peaks at 7.6°, 25.6° and 27.7°, it is preferred to use, for example, the method of the present invention of once dissolving the compound represented by formula (B) in an organic solvent and then performing a coupling reaction. Examples of the organic solvent which can be used here include an alcohol solvent and a ketone-based solvent. Preferred examples of the alcohol solvent include methanol, ethanol, isopropanol, ethylene glycol and diethylene glycol, with methanol being more preferred.

Preferred examples of the ketone-based solvent include acetone, methyl ethyl ketone and cyclohexanone, with acetone being more preferred.

Another production method of the azo pigment composition of the present invention is characterized in that in a coupling reaction between a diazonium compound obtained by converting a heterocyclic amine represented by formula (A) into a diazonium form and a compound represented by formula (B), the coupling reaction is performed in the presence of a polar aprotic solvent.

A pigment composition containing as the main component a crystal of formula (2) having characteristic X-ray diffraction peaks at 7.2° and 25.9° or a crystal of formula (3) having characteristic X-ray diffraction peaks at 7.6°, 25.6° and 27.7° can be efficiently produced also by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, acetone, methyl ethyl ketone, acetonitrile, and a mixed solvent thereof. Among these solvents, acetone, methyl ethyl ketone, N,N-dimethylacetamide and acetonitrile are preferred. In the case of using such a solvent, the compound represented by formula (2) or (3) may or may not be completely dissolved in the solvent.

According to the usage of the compound obtained by the production method above, the pH may or may not be adjusted by adding a base as a purification step. In the case of adjusting the pH, the pH is preferably from 4 to 10, more preferably from 5 to 8, still more preferably from 5.5 to 7.5.

When the pH is 10 or less, in view of hue, neither discoloration/color fading nor increase of reddish tint are caused, which is preferred from the standpoint of ensuring a hue of constant quality. When the pH is 4 or more, this is preferred because, for example, in use as an ink for inkjet recording, a problem such as corrosion of a nozzle hardly arises.

The compound represented by formula (1), (2) or (3) is obtained as a crude azo pigment (crude) by the production method above.

The present invention also relates to an azo pigment composition produced by the above-described production method.

[Post-Treatment Step]

The production method of the present invention preferably contains a step of performing a post-treatment. Examples of the post-treatment step include a step of controlling a pigment particle by a milling treatment (e.g., solvent salt milling, salt milling, dry milling, solvent milling, acid pasting) or a solvent heating treatment, and a step of surface treatment with a resin, a surfactant, a dispersant or the like.

The compound represented by formula (1), (2) or (3) of the present invention is preferably subjected to a solvent heating treatment and/or a solvent salt milling as the post-treatment step. For example, an azo pigment in desired crystalline morphology can be produced by performing reflux in an organic solvent excluding water.

Examples of the solvent used in the solvent heating treatment include water, an aromatic hydrocarbon-based solvent such as toluene and xylene, a halogenated hydrocarbon-based solvent such as chlorobenzene and o-dichlorobenzene, an alcohol-based solvent such as isopropanol and isobutanol, a polar aprotic organic solvent such as N,N-dimethylformamide, N,N-dimethylacetamide, N-methyl-2-pyrrolidone, acetone, methyl ethyl ketone and acetonitrile, glacial acetic acid, pyridine, and a mixture thereof. In such a solvent, an inorganic or organic acid or base may be further added.

The temperature at the solvent heating treatment varies depending on the primary particle diameter of the desired pigment but is preferably from 40 to 150° C., more preferably from 60 to 100° C., and the treatment time is preferably from 30 minutes to 24 hours.

Examples of the solvent salt milling include a method of performing kneading and milling in a kneader after charging thereinto the crude azo pigment, an inorganic salt and an organic solvent incapable of dissolving them. The inorganic salt which can be suitably used is a water-soluble inorganic salt, and, for example, an inorganic salt such as sodium chloride, potassium chloride and sodium sulfate is preferably used. It is more preferred to use an inorganic salt having an average particle diameter of 0.5 to 50 μm. The amount of the inorganic salt used is preferably from 3 to 20 times by mass, more preferably from 5 to 15 times by mass, based on the crude azo pigment. The organic solvent which can be suitably used is a water-soluble organic solvent and in view of safety, a high boiling point solvent is preferred, because the solvent enters a readily evaporatable state by the rise of temperature during kneading. Examples of such an organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol and a mixture thereof. The amount of the water-soluble organic solvent used is preferably from 0.1 to 5 times by mass based on the crude azo pigment. The kneading temperature is preferably from 20 to 130° C., more preferably from 40 to 110° C. Examples of the kneading machine which can be used include a kneader and a mix-muller.

[Pigment Dispersion]

The pigment dispersion contains at least one of an azo pigment represented by formula (1), its tautomer and a salt or hydrate thereof, and preferably, an azo pigment represented by formula (2) or (3) is used. Thanks to use of this pigment, a pigment dispersion excellent in the color characteristics, durability and dispersion stability can be obtained.

The pigment dispersion may be an aqueous system or a non-aqueous system, but a pigment dispersion of aqueous system is preferred. In the aqueous pigment dispersion, as for the aqueous liquid in which the pigment is dispersed, a mixture containing water as the main component and having added thereto, if desired, a hydrophilic organic solvent may be used. Examples of the hydrophilic organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone.

Furthermore, the aqueous pigment dispersion may contain an aqueous resin. The aqueous resin includes a water-dissolvable resin capable of dissolving in water, a water-dispersible resin capable of dispersing in water, a colloidal dispersion resin, and a mixture thereof. Specific examples of the aqueous resin include acryl-based, styrene-acryl-based, polyester-based, polyamide-based, polyurethane-based and fluorine-based resins.

For enhancing the dispersion of the pigment and the quality of the image, a surfactant and a dispersant may be used. The surfactant includes anionic, nonionic, cationic and amphoteric surfactants, and any surfactant may be used, but an anionic or nonionic surfactant is preferably used. Examples of the anionic surfactant include a fatty acid salt, an alkylsulfuric acid ester salt, an alkylbenzenesulfonate, an alkylnaphthalenesulfonate, a dialkylsulfosuccinate, an alkyldiaryl ether disulfonate, an alkylphosphate, a polyoxyethylene alkyl ether sulfate, a polyoxyethylene alkylaryl ether sulfate, a naphthalenesulfonic acid-formalin condensate, a polyoxyethylene alkylphosphoric acid ester salt, a glycerol borate fatty acid ester and a polyoxyethylene glycerol fatty acid ester.

Examples of the nonionic surfactant include a polyoxyethylene alkyl ether, a polyoxyethylene alkylaryl ether, a polyoxyethylene oxypropylene block copolymer, a sorbitan fatty acid ester, a polyoxyethylene sorbitan fatty acid ester, a polyoxyethylene sorbitol fatty acid ester, a glycerin fatty acid ester, a polyoxyethylene fatty acid ester, a polyoxyethylene alkylamine and a fluorine- or silicon-containing surfactant.

The amount of the surfactant added to the dispersion is not particularly limited but is preferably 1 mass % or more, more preferably from 1 to 10 mass %, still more preferably from 1 to 3 mass %.

The non-aqueous pigment dispersion is obtained by dispersing the pigment represented by formula (1), (2) or (3) in a non-aqueous vehicle. Examples of the resin used for the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, hydrochlorinated rubber, phenol resin, alkyd resin, polyester resin, unsaturated polyester resin, amino resin, epoxy resin, vinyl resin, vinyl chloride, vinyl chloride-vinyl acetate copolymer, acrylic resin, methacrylic resin, polyurethane resin, silicon resin, fluororesin, drying oil, synthesized drying oil, styrene/maleic acid resin, styrene/acryl resin, polyamide resin, polyimide resin, benzoguanamine resin, melamine resin, urea resin chlorinated polypropylene, butyral resin and vinylidene chloride resin. A photo-curable resin may also be used as the non-aqueous vehicle.

Examples of the solvent used for the non-aqueous vehicle include an aromatic solvent such as toluene, xylene and methoxybenzene, an acetic acid ester-based solvent such as ethyl acetate, butyl acetate, propylene glycol monomethyl ether acetate and propylene glycol monoethyl ether acetate, a propionate-based solvent such as ethoxyethyl propionate, an alcohol-based solvent such as methanol and ethanol, an ether-based solvent such as butyl cellosolve, propylene glycol monomethyl ether, diethylene glycol ethyl ether and diethylene glycol dimethyl ether, a ketone-based solvent such as methyl ethyl ketone, methyl isobutyl ketone and cyclohexanone, an aliphatic hydrocarbon-based solvent such as hexane, a nitrogen compound-based solvent such as N,N-dimethylformamide, γ-butyrolactam, N-methyl-2-pyrrolidone, aniline and pyridine, a lactone-based solvent such as γ-butyrolactone, and a carbamic acid ester such as a 48:52 mixture of methyl carbamate and ethyl carbamate.

The pigment dispersion is obtained by dispersing the above-described azo pigment and an aqueous or non-aqueous medium by means of a dispersing device. As for the dispersing device, there can be used a simple stirrer or impeller stirring system, an in-line stirring system, a mill system (e.g., colloid mill, ball mill, sand mill, bead mill, attritor, roll mill, jet mill, paint shaker, agitator mill), an ultrasonic system, or a high-pressure emulsifying and dispersing system (high-pressure homogenizer; specific examples of the commercially available device include Gaulin Homogenizer, Microfluidizer and DeBEE2000).

In the present invention, the volume average particle diameter of the pigment is preferably from 0.01 to 0.2 μm. Incidentally, the volume average particle diameter of the pigment particle indicates the particle diameter of a pigment itself or when an additive such as dispersant is adhering to a color material, indicates the particle diameter of a particle to which the additive is attached. In the present invention, a Nanotrac UPA particle size distribution analyzer (NANOTRAC UPA-EX150 manufactured by Nikkiso Co., Ltd.) is used as the apparatus for measuring the volume average particle diameter of the pigment. The measurement is performed by charging 3 ml of a pigment dispersion in a measuring cell in accordance with a predetermined measuring method. As for the parameters input at the measurement, the viscosity of the ink is used as the viscosity, and the density of the pigment is used as the density of dispersed particles.

The volume average particle diameter is more preferably from 20 to 200 nm, still more preferably from 30 to 180 nm, and most preferably from 30 to 150 nm. If the volume average particle diameter of particles in the pigment dispersion is less than 20 nm, storage stability cannot be ensured in some cases, whereas if it exceeds 250 nm, the optical density sometimes lowers.

The concentration of the pigment contained in the pigment dispersion is preferably from 1 to 35 mass %, more preferably from 2 to 25 mass %. If the concentration is less than 1 mass %, when the pigment is used alone as an ink, a sufficiently high image density may not be obtained, whereas if the concentration exceeds 35 mass %, the storage stability may deteriorate.

[Ink Composition]

The yellow ink composition, magenta ink composition and cyan ink composition (hereinafter simply referred to as an "ink composition") for use in the present invention can be produced by dissolving and/or dispersing the colorant compound of the present invention in a lipophilic medium or an aqueous medium. The ink composition preferably contains the above-described pigment dispersion.

The amount of the pigment added in the ink composition constituting the ink set of the present invention may be appropriately determined but is preferably from 1 to 8 mass %, more preferably from 1 to 7 mass %, and still more preferably from 1.5 to 6 mass %.

The contained amount of the colorant in the yellow ink composition is preferably from 2.5 to 6.5 mass %, more preferably from 3 to 6 mass %, and still more preferably from 4 to 5 mass %.

In the ink set of the present invention, the ink compositions preferably contain at least one of a dispersant and a penetrant. In the present invention, the composition of the ink composition may be appropriately determined by taking into consideration the recording method or the like but, fundamentally, the composition is preferably composed of the above-described colorant, water and a water-soluble organic solvent.

[Dispersant]

As for the preferred dispersant, a dispersant commonly used for the preparation of a pigment liquid dispersion, such as polymer dispersant, may be used, The dispersant is more preferably a high-molecular vinyl polymer particle.

(High-Molecular Vinyl Polymer Particle)

The high-molecular vinyl polymer particle for use in the present invention contains the azo pigment represented by formula (1), its tautomer or a salt or hydrate thereof and a high-molecular vinyl polymer (hereinafter sometimes referred to as a "resin" or a "specific resin") containing (a) a hydrophobic structural unit having an aromatic ring bonded to the polymer main chain through a linking group and (b) a hydrophilic structural unit.

The high-molecular vinyl polymer particle containing the pigment for use in the present invention can be produced by a conventional physical or chemical method using the specific resin, the pigment and the like. For example, the high-molecular vinyl polymer can be produced by the method described in JP-A-9-151342, JP-A-10-140065, JP-A-11-209672, JP-A-11-172180, JP-A-10-25440 and JP-A-11-43636. Specific examples thereof include a phase inversion method and an acid precipitation method described in JP-A-9-151342 and JP-A-10-140065. Above all, a phase inversion method is preferred in view of dispersion stability.

The specific resin preferably contains (a) a hydrophobic structural unit having an aromatic ring bonded to the polymer main chain through a linking group and (b) a hydrophilic structural unit.

a) Phase Inversion Method

The phase inversion method is fundamentally a self-dispersion (phase inversion emulsification) method of dispersing a mixed melt of a self-dispersing or self-dissolving resin and a pigment in water, where a pigment-containing high-molecular vinyl polymer particle can be obtained. The term "mixed melt" as used herein includes a state of the melt being mixed without dissolving, a state of the melt being dissolved and mixed, and a state containing these two states. Specific examples of the production method by the "phase inversion method" include the method described in JP-A-10-140065.

b) Acid Precipitation Method

The acid precipitation method is a method of preparing a hydrous cake composed of a resin and a pigment and neutralizing a part or all of anionic groups of the resin in the hydrous cake by using a basic compound to obtain a pigment-containing high-molecular vinyl polymer particle.

The acid precipitation method specifically includes a method comprising (1) a step of dispersing a resin and a pigment in an alkaline aqueous medium and, if desired, performing a heat treatment to gel the resin, (2) a step of adjusting the pH to neutral or acidic to hydrophobe the resin, thereby firmly attaching the resin to the pigment, (3) a step of, if desired, performing filtration and water washing to obtain a hydrous cake, (4) a step of neutralizing a part or all of anionic groups of the resin in the hydrous cake by using a basic compound and then re-dispersing the cake in an aqueous medium, and (5) a step of, if desired, performing a heat treatment to gel the resin.

Specific examples of the production method by the phase inversion method or acid precipitation method include the methods described in JP-A-9-151342 and JP-A-10-140065.

In the ink composition of the present invention, the pigment-containing high-molecular vinyl polymer particle can be obtained through a step of obtaining a specific resin as an aqueous dispersion, more specifically, a preparation step of preparing a dispersion of a pigment-containing high-molecular vinyl polymer particle by a method comprising the following steps (1) and (2). Also, the production of the ink composition of the present invention can be performed suitably by a method comprising the above-described preparation step, where the dispersion of a pigment-containing high-molecular vinyl polymer particle obtained in the preparation step is used together with water and a water-soluble organic solvent to provide an aqueous ink.

Step (1): A step of dispersing a mixture containing the specific resin for use in the present invention, an organic solvent, a neutralizing agent, a pigment and water by stirring or the like to obtain a dispersion.

Step (2): A step of removing the organic solvent from the dispersion.

The stirring method is not particularly limited, and a mixing/stirring apparatus in general use and, if desired a disperser such as ultrasonic disperser, high-pressure homogenizer or bead mill may be used.

The preferred organic solvent includes an alcohol-based solvent, a ketone-based solvent and an ether-based solvent.

Examples of the alcohol-based solvent include isopropyl alcohol, n-butanol, tert-butanol and ethanol. Examples of the ketone-based solvent include acetone, methyl ethyl ketone, diethyl ketone and methyl isobutyl ketone. Examples of the ether-based solvent include dibutyl ether and dioxane. Among these solvents, a ketone-based solvent such as methyl ethyl ketone and an alcohol-based solvent such as isopropyl alcohol are preferred, and methyl ethyl ketone is most preferred.

The neutralizing agent is used to neutralize a part or all of dissociative groups and form a stably emulsified or dispersed state of the specific resin in water. In the case where the specific resin has an anionic dissociative group as the dissociative group, the neutralizing agent used here includes a basic compound such as organic amine compound, ammonia, and hydroxide of an alkali metal. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine and triisopropanolamine. Examples of the hydroxide of an alkali metal include lithium hydroxide, sodium hydroxide and potassium hydroxide. Among these, in view of dispersion stability in water, sodium hydroxide, potassium hydroxide, triethylamine and triethanolamine are preferred, and sodium hydroxide and potassium hydroxide are more preferred.

The content of the basic compound is preferably from 5 to 120 mol %, more preferably from 10 to 120 mol %, still more preferably from 80 to 120 mol %, per 100 mol % of the dissociative group. When the content is 5 mol % or more, this is effective in stabilizing dispersion in water, and when it is 120 mol % or less, an effect of reducing water-soluble components is produced.

In the step (2), the organic solvent is distilled off from the dispersion obtained in the step (1) by an ordinary method such as reduced-pressure distillation to effect phase inversion to an aqueous system, whereby a dispersion of a high-molecular vinyl polymer particle containing a pigment with the pigment particle surface being coated by the resin can be obtained. In the obtained dispersion, the organic solvent is substantially removed, and the amount of the organic solvent is preferably 0.2 mass % or less, more preferably 0.1 mass % or less.

More specifically, the ink composition can be produced, for example, by providing (1) a step of mixing a solution that is prepared by dissolving the anionic group-containing specific resin for use in the present invention in an organic solvent, with a basic compound (neutralizing agent) and water, thereby effecting neutralization, (2) a step of mixing the resulting mixed solution and a pigment to form a suspension and then dispersing the pigment by a disperser or the like to obtain a pigment liquid dispersion, and (3) a step of removing the organic solvent, for example by distillation to coat the pigment with the anionic group-containing specific resin and dispersing the coated pigment in an aqueous medium to obtain an aqueous dispersion.

For more specific details, JP-A-11-2096722 and JP-A-11-172180 may be referred to.

The average particle diameter of the pigment-containing high-molecular vinyl polymer particle contained in the ink composition of the present invention is preferably from 10 to 400 nm, more preferably from 10 to 200 nm, still more preferably from 50 to 150 nm. When the average particle diameter is 10 nm or more, the suitability for production is enhanced, and when it is 400 nm or less, good storage stability is obtained. The pigment-containing high-molecular vinyl polymer particle is not particularly limited in its particle diameter distribution and may be either one having a broad particle diameter distribution or one having a monodisperse particle diameter distribution.

The average particle diameter and particle diameter distribution of the pigment-containing high-molecular vinyl polymer particle can be determined by measuring the volume average diameter according to a dynamic light scattering method using a Nanotrac particle size distribution measuring apparatus, UPA-EX150 (manufactured by Nikkiso Co., Ltd.).

In the present invention, the dispersing treatment may be performed using, for example, a ball mill, a roll mill, a bead mill, a high-pressure homogenizer, a high-speed stirring-type disperser or an ultrasonic homogenizer.

In the ink composition, the content of the high-molecular vinyl polymer particle containing a pigment covered with the specific resin for use in the present invention is, in view of dispersion stability and concentration of the ink composition, preferably from 1 to 10 mass %, more preferably from 2 to 8 mass %, still more preferably from 2 to 6 mass %.

[Penetrant]

Examples of the penetrant include various surfactants such as anionic surfactant, cationic surfactant and amphoteric surfactant, alcohols such as methanol, ethanol and iso-propyl alcohol, and lower alkyl ethers of polyhydric alcohol, such as ethylene glycol monomethyl ether, diethylene glycol monoethyl ether, diethylene glycol monobutyl ether, triethylene glycol monobutyl ether, propylene glycol monobutyl ether and dipropylene glycol monobutyl ether. Above all, use of diethylene glycol monobutyl ether or triethylene glycol monobutyl ether is preferred.

The amount of the penetrant added may be appropriately determined but is preferably on the order of 1 to 20 mass %, more preferably on the order of 1 to 10 mass %.

Furthermore, examples of the penetrant include acetylene glycols represented by the following formula (1):

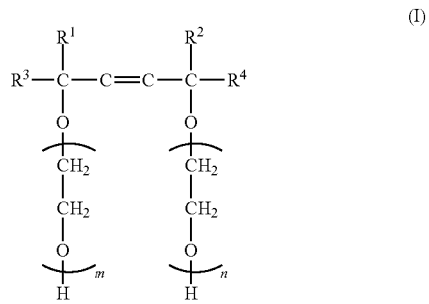

wherein $0 \leq m+n \leq 50$, and $R^1$, $R^2$, $R^3$ and $R^4$ each independently represents an alkyl group (preferably an alkyl group having a carbon number of 1 to 6).

A commercially available product may also be used as the acetylene glycols represented by the formula above, and specific examples thereof include OLFINE Y, SURFYNOL 82, SURFYNOL 440, SURFYNOL 465 and SURFYNOL 485 (all produced by Air Products and Chemicals, Inc.). In particular, use of SURFYNOL 465 is preferred. These penetrants may be used individually or in combination of two or more thereof. The amount of the penetrant added is preferably on the order of 0.1 to 5 mass %, more preferably on the order of 0.5 to 2 mass %.

In the present invention, the penetrant is preferably at least one of lower alkyl ethers of polyhydric alcohol and acetylene glycols.

(Water-Soluble Solvent)

The ink composition contains a water-soluble solvent. The water-soluble solvent includes a water-soluble organic solvent. The water-soluble organic solvent is used for the purpose of using it as an anti-drying agent, a wetting agent or a penetration accelerator (penetrant).

The anti-drying agent is used for the purpose of preventing nozzle clogging due to drying of the ink for inkjet recording at an ink ejection port. The anti-drying agent and wetting agent are preferably a water-soluble organic solvent having a vapor pressure lower than that of water. Also, for the purpose of allowing more successful penetration of the inkjet ink into paper, a water-soluble organic solvent is suitably used as the penetration accelerator.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, polyoxyethylene glyceryl ether, polyoxypropylene glyceryl ether, 2-butene-1,4-diol, 2-ethyl-1,3-hexanediol, 2-methyl-2,4-pentanediol, 1,2-octanediol, 1,2-hexanediol, 1,2-pentanediol and 4-methyl-1,2-pentanediol; saccharides such as glucose, mannose, fructose, ribose, xylose, arabinose, galactose, aldonic acid, glucitol, (sorbitol), maltose, cellobiose, lactose, sucrose, trehalose and maltotriose; sugar alcohols; hyaluronic acids; so-called solid wetting agents such as ureas; alkyl alcohols having a carbon number of 1 to 4, such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-tert-butyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane. These organic solvents may be used individually or in combination of two or more thereof.

In use as an anti-drying agent or a wetting agent, a polyol compound is useful, and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol and 1,2,6-hexanetriol. One of these compounds may be used alone, or two or more thereof may be used in combination.

In use as a penetrant, a polyol compound is preferred, and examples of the aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol. Among these, 2-ethyl-1,3-hexanediol and 2,2,4-trimethyl-1,3-pentanediol are preferred.

As regards the water-soluble solvent for use in the present invention, one kind may be used alone or a mixture of two or more kinds may be used. Preferred examples of the water-soluble solvent include glycerin, dipropylene glycol, polyoxyethylene glyceryl ether and polyoxypropylene glyceryl ether.

The content of the water-soluble organic solvent is from 5 to 60 mass %, preferably from 10 to 40 mass.

The amount added of water for use in the present invention is not particularly limited but is preferably from 10 to 99 mass %, more preferably from 30 to 80 mass %, still more preferably from 50 to 70 mass %.

(Other Components)

The ink of the present invention may contain other additives. Examples of other additives include known additives such as ultraviolet absorber, anti-fading agent, fungicide, pH adjusting agent, rust preventing agent, antioxidant, emulsion stabilizer, antiseptic, defoaming agent, viscosity adjusting agent, dispersion stabilizer and chelating agent.

Examples of the ultraviolet absorber include benzophenone-based ultraviolet absorber, a benzotriazole-based ultraviolet absorber, a salicylate-based ultraviolet absorber, a cyanoacrylate-based ultraviolet absorber and a nickel complex salt-based ultraviolet absorber.

As for the anti-fading agent, various organic or metal complex-based anti-fading agents may be used. Examples of the organic anti-fading agent include hydroquinones, alkoxyphenols, dialkoxyphenols, phenols, anilines, amines, indanes, chromans, alkoxyanilines and heterocycles, and examples of the metal complex include a nickel complex and a zinc complex.

Examples of the fungicide include sodium dehydroacetate, sodium benzoate, sodium pyridinethione-1-oxide, ethyl p-hydroxybenzoate, 1,2-benzisothiazolin-3-one, sodium sorbate and pentachlorophenol sodium. The fungicide is preferably used in an amount of 0.02 to 1.00 mass % in the ink.

The pH adjusting agent is not particularly limited as long as it can adjust the pH to a desired value without adversely affecting the recording ink prepared, and an appropriate pH adjusting agent may be selected according to the purpose, but examples thereof include alcohol amines (e.g., diethanolamine, triethanolamine, 2-amino-2-ethyl-1,3-propanediol), alkali metal hydroxides (e.g., lithium hydroxide, sodium hydroxide, potassium hydroxide), ammonium hydroxides (e.g., ammonium hydroxide, quaternary ammonium hydroxide), phosphonium hydroxides and alkali metal carbonates.

Examples of the rust preventing agent include acidic sulfite, sodium thiosulfate, ammonium thiodiglycolate, diisopropylammonium nitrite, pentaerythritol tetranitrate and dicyclohexylammonium nitrite.

Examples of the antioxidant include a phenol-based antioxidant (including a hindered phenol-based antioxidant), an amine-based antioxidant, a sulfur-based antioxidant and a phosphorous-based antioxidant.

Examples of the chelating agent include sodium ethylenediaminetetraacetate, sodium nitrilotriacetate, sodium hydroxyethylethylenediaminetriacetate, sodium diethylentriaminepentaacetate and sodium uramyldiacetate.

(Resin Fine Particle)

The ink of the present invention may contain a resin fine particle or a polymer latex. Examples of the resin fine particle or polymer latex which can be used include acrylic resin, vinyl acetate resin, styrene-butadiene-based resin, vinyl chloride resin, acryl-styrene-based resin, butadiene-based resin, styrene-based resin, crosslinked acrylic resin, crosslinked styrene-based resin, benzoguanamine resin, phenol resin, silicone resin, epoxy resin, urethane-based resin, paraffin-based resin and fluororesin. Of these examples, preferred are acrylic resin, acryl-styrene-based resin, styrene-based resin, crosslinked acrylic resin and crosslinked styrene-based resin.

Preferred examples of the resin fine particle include a self-dispersing polymer fine particle. The self-dispersing polymer fine particle is a fine particle of a high-molecular polymer capable of forming a dispersed state in an aqueous medium in the absence of other surfactants by the action of a functional group (in particular, an acidic group or a salt thereof) possessed by the polymer itself, and this is a high-molecular polymer not containing a free emulsifier. The dispersed state as used herein includes both an emulsified state (emulsion) where the high-molecular polymer is dispersed in a liquid state in an aqueous medium, and a dispersed state (suspension) where the high-molecular polymer is dispersed in a solid state in an aqueous medium. In the present invention, a high-molecular polymer capable of forming a dispersed state where the high-molecular polymer is dispersed in a solid state is preferred.

In view of self-dispersibility, the self-dispersing polymer fine particle for use in the present invention preferably contains a high-molecular polymer containing a hydrophilic constituent unit and a constituent unit derived from an aromatic group-containing monomer.

The hydrophilic constituent unit may be any hydrophilic constituent unit as long as it is derived from a hydrophilic group-containing monomer, and this unit may be derived from one kind of a hydrophilic group-containing monomer or may be derived from two or more kinds of hydrophilic group-containing monomers. The hydrophilic group is not particularly limited and may be a dissociative group or a nonionic hydrophilic group. From the standpoint of accelerating self-dispersion and stabilizing the formed emulsion or dispersion state, the hydrophilic group is preferably a dissociative group, more preferably an anionic dissociative group. Examples of the dissociative group include a carboxyl group, a phosphoric acid group and a sulfonic acid group. Among these, a carboxyl group is preferred in view of fixing property of the ink composition prepared. Examples of the dissociative group-containing monomer include an unsaturated carboxylic acid monomer, an unsaturated sulfonic acid monomer and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid and 2-methacryloyloxymethylsuccinic acid. Specific examples of the unsaturated sulfonic acid monomer include styrenesulfonic acid, 2-acrylamido-2-methylpropanesulfonic acid, 3-sulfopropyl (meth)acrylate and bis-(3-sulfopropyl)-itaconic acid ester. Specific examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate. In view of dispersion stability and ejection stability, an unsaturated carboxylic acid monomer is preferred, and an acrylic acid and a methacrylic acid are more preferred.

The aromatic group-containing monomer is not particularly limited as long as it is a compound containing an aromatic group and a polymerizable group. The aromatic group may be a group derived from an aromatic hydrocarbon or a group derived from an aromatic heterocycle. An aromatic group derived from an aromatic hydrocarbon is preferred in view of stability of the particle shape in an aqueous medium. The polymerizable group may be a condensation polymerizable group or an addition polymerizable group. In the present invention, considering the stability of particle shape in an aqueous medium, an addition polymerizable group is preferred, and a group containing an ethylenically unsaturated bond is more preferred.

The aromatic group-containing monomer is preferably a monomer having an aromatic group derived from an aromatic hydrocarbon and an ethylenically unsaturated bond, more preferably an aromatic group-containing (meth)acrylate monomer. Examples of the aromatic group-containing monomer include a phenoxyethyl (meth)acrylate, a benzyl (meth)acrylate, a phenyl (meth)acrylate and a styrene-based monomer. Among these, from the aspect of the balance between hydrophilicity and hydrophobicity of the polymer chain and the ink fixing property, at least one selected from a phenoxyethyl (meth)acrylate, a benzyl (meth)acrylate and a phenyl (meth)acrylate is preferred, a phenoxyethyl (meth)acrylate is more preferred, and phenoxyethyl acrylate is still more preferred.

Incidentally, the term "(meth)acrylate" means an acrylate or a methacrylate. It is preferred that the self-dispersing polymer fine particle contains a constituent unit derived from an aromatic group-containing (meth)acrylate monomer and the content thereof is from 10 to 95 mass %. When the content of the aromatic group-containing (meth)acrylate monomer is from 10 to 95 mass %, the stability of self-emulsified or self-dispersed state is enhanced and an increase in the ink viscosity can be suppressed. In view of stability of the self-dispersed state or from the standpoint of stabilizing the particle shape in an aqueous medium by the use of a hydrophobic interaction between aromatic rings or reducing the amount of water-soluble components by virtue of appropriate hydrophobization of the particle, the content of the constituent unit is more preferably from 15 to 90 mass %, still more preferably from 15 to 80 mass %, yet still more preferably from 25 to 70 mass %.

The self-dispersing polymer fine particle may consist of, for example, a constituent unit composed of an aromatic group-containing monomer and a constituent unit composed of a dissociative group-containing monomer and may further contain other constituent units, if desired.

The monomer forming other constituent units is not particularly limited as long as it is a monomer copolymerizable with the aromatic group-containing monomer and dissociative group-containing monomer. Above all, an alkyl group-containing monomer is preferred in view of flexibility of the polymer skeleton and easy control of the glass transition temperature (Tg).

Examples of the alkyl group-containing monomer include an alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, tert-butyl (meth)acrylate, hexyl (meth)acrylate and ethylhexyl (meth)acrylate; an ethylenically unsaturated monomer having a hydroxyl group, such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate and hydroxyhexyl (meth)acrylate; a dialkylaminoalkyl (meth)acrylate such as dimethylaminoethyl (meth)acrylate; and a (meth)acrylamide including an N-hydroxyalkyl (meth)acrylamide such as N-hydroxymethyl (meth)acrylamide, N-hydroxyethyl (meth)acrylamide and N-hydroxybutyl (meth)acrylamide, and an N-alkoxyalkyl (meth)acrylamide such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide and N-(n-, iso) butoxyethyl (meth)acrylamide.

The molecular weight of the high-molecular polymer constituting the self-dispersing polymer fine particle for use in the present invention is, in terms of the mass average molecular weight, preferably from 3,000 to 200,000, more preferably from 5,000 to 150,000, still more preferably from 10,000 to 100,000. By setting the mass average molecular weight to 3,000 or more, the amount of water-soluble components can be effectively reduced, and by setting the mass average molecular weight to 200,000 or less, the self-dispersion stability can be raised.

The mass average molecular weight can be measured by gel permeation chromatograph (GPC).

From the standpoint of controlling the hydrophilicity and hydrophobicity of the polymer, the high-molecular polymer constituting the self-dispersing polymer fine particle preferably contains an aromatic group-containing (meth)acrylate monomer in a copolymerization ratio of 15 to 90 mass %, a carboxyl group-containing monomer and an alkyl group-containing monomer and has an acid value of 25 to 100 and a mass average molecular weight of 3,000 to 200,000, more preferably contains an aromatic group-containing (meth)acrylate monomer in a copolymerization ratio of 15 to 80 mass %, a carboxyl group-containing monomer and an alkyl group-containing monomer and has an acid value of 25 to 95 and a mass average molecular weight of 5,000 to 150,000.

The average particle diameter of the self-dispersing polymer fine particle is preferably from 10 nm to 1 µm, more preferably from 10 to 200 nm, still more preferably from 20 to 100 nm, yet still more preferably from 20 to 50 nm.

The amount of the self-dispersing fine particle added is preferably from 0.5 to 20 mass %, more preferably from 3 to 20 mass %, still more preferably from 5 to 15 mass %, based on the ink.

The glass transition temperature Tg of the self-dispersing polymer fine particle is preferably 30° C. or more, more preferably 40° C. or more, still more preferably 50° C. or more.

The polymer particle is not particularly limited in its particle diameter distribution and may be either one having a broad particle diameter distribution or one having a monodisperse particle diameter distribution. Also, two or more kinds of polymer fine particles each having a monodisperse particle diameter distribution may be mixed and used.

(Liquid Composition for Enhancing Printability)

In the present invention, for example, a liquid composition for enhancing the printability is preferably imparted to a printing medium.

One preferred example of the liquid composition for enhancing the printability, which can be used in the present invention, is a liquid composition capable of producing an aggregate by changing the pH of the ink. At this time, the pH of the liquid composition is preferably from 1 to 6, more preferably from 2 to 5, still more preferably from 3 to 5. The component of the liquid composition is preferably selected from, for example, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts thereof. One kind of these compounds may be used, or two or more kinds may be used in combination.

One preferred example of the liquid composition for enhancing the printability, which can be used in the present invention, is a treating solution having added thereto a polyvalent metal salt or a polyallylamine. Examples of the component of the liquid composition include, as the polyvalent metal salt, an alkaline earth metal of Group 2A of the periodic table (e.g., magnesium, calcium), a transition metal of Group 3B of the periodic table (e.g., lanthanum), a cation from Group 3A of the periodic table (e.g., aluminum), and lanthanides (e.g., neodymium); and include polyallylamine and a polyallylamine derivative. Of these, calcium and magnesium are preferred. Examples of the anion that may be preferably employed as a counter salt of calcium or magnesium include a carboxylate salt (e.g., formate, acetate, benzoate), a nitrate, a chloride and a thiocyanate. As for the amount added to the treating solution, the salt may be allowed to exist in an amount of about 1 to about 10 mass %, preferably from about 1.5 to about 7 mass %, more preferably from about 2 to about 6 mass %, in the treating solution.

(Physical Properties of Ink)

The surface tension of the ink of the present invention is preferably from 20 to 60 mN/m, more preferably 20 to 45 mN/m, still more preferably 25 to 40 mN/m.

The viscosity at 20° C. of the ink of the present invention is preferably from 1.2 to 15.0 mPa·s, more preferably from 2 mPa·s to less than 13 mPa·s, still more preferably from 2.5 mPa·s to less than 10 mPa·s.

[Yellow Ink Composition]

The yellow ink composition for use in the present invention contains an azo pigment represented by formula (1), its tautomer, or a salt or hydrate thereof.

In the ink set of the present invention, in addition to the azo pigment used as the colorant of the yellow ink composition, an arbitrary yellow pigment can be used in combination. Examples thereof include C.I. Pigment Yellow 1 (Fast Yellow G), 2, 3, 12 (Disazo Yellow AAA), 13, 14, 16, 17, 24, 34, 35, 37, 42 (yellow iron oxide), 53, 55, 73, 74, 75, 81, 83 (Disazo Yellow HR), 93, 95, 97, 98, 100, 101, 104, 108, 109, 110, 114, 117, 120, 128, 129, 138, 150, 151, 153, 154, 155, 185 and 213 and further include: an aryl- or heteryl-azo pigment having phenols, naphthols, anilines, heterocycles (e.g., pyrazolone, pyridone), open-chain-type active methylene compounds or the like as the coupling component; an azomethine pigment having open-chain-type active methylene compounds or the like as the coupling component; a methine pigment such as benzylidene pigment and monomethine oxonol pigment; and a quinone-based pigment such as naphthoquinone pigment and anthraquinone pigment. Examples other than these species include a quinophthalone pigment, a nitro.nitroso pigment, an acridine pigment and an acridinone pigment. Such a yellow pigment may be a pigment that provides a yellow color for the first time when a part of the chromophore is dissociated. In this case, the counter cation may be an inorganic cation such as alkali metal, alkaline earth metal and ammonium, an organic cation such as pyridinium and quaternary ammonium salt, or a polymer cation having such a cation in a partial structure.

[Magenta Ink Composition]

The magenta ink composition for use in the present invention contains, as the colorant, at least one pigment selected from quinacridone pigments. Of these, C.I. Pigment Violet 19 and C.I. Pigment Red 122 are preferred, and C.I. Pigment Red 122 is most preferred.

In the ink set of the present invention, a dark magenta ink composition and a light magenta ink composition can be contained as the magenta ink composition. In the case where the ink set contains both a dark magenta ink composition and a light magenta ink composition, at least one of these two ink compositions preferably contains C.I. Pigment Violet 19 or C.I. Pigment Red 122 as the colorant, and it is more preferred that the light magenta ink composition contains C.I. Pigment Violet 19 or C.I. Pigment Red 122 as the colorant. Most preferably, both the dark magenta ink composition and the light magenta ink composition contain C.I. Pigment Violet 19 or C.I. Pigment Red 122 as the colorant.

In the ink for inkjet recording of the present invention, the concentration of the magenta pigment in the magenta ink composition can be appropriately determined based on the color value of the pigment used. The contained amount of the colorant in the magenta ink composition is preferably from 2.5 to 6.5 mass %, more preferably from 3 to 6 mass %, and still more preferably from 5 to 6 mass %. In general, the colorant is preferably contained in an amount of 0.2 to 10 mass % as a total of C.I. Pigment Violet 19 and C.I. Pigment Red 122, in the ink for inkjet recording. By setting the colorant (pigment) concentration to 0.2 mass % or more, sufficient coloring power as an ink can be ensured, and by setting the colorant (pigment) concentration to 10 mass % or less, it becomes easy, for example, to ensure ejection of the ink composition for use in the inkjet recording method from a nozzle or prevent nozzle clogging.

The mass ratio between C.I. Pigment Violet 19 and C.I. Pigment Red 122 in the magenta ink composition is not particularly limited but is preferably from 4:1 to 1:8, more preferably from 2:1 to 1:4.

In addition to C.I. Pigment Violet 19 or C.I. Pigment Red 122, other magenta dyes may be used in combination as the colorant of the magenta ink composition. Also in the case of using three or more kinds of colorants in combination, the total content of all colorants is preferably in the range above.

Examples of the magenta pigment which can be used in combination with the quinacridone pigment typified by C.I. Pigment Violet 19 and C.I. Pigment Red 122 include C.I. Pigment Red 5, 7, 12, 48 (Ca), 48 (Mn), 57 (Ca), 57:1, 112, 123, 168, 184 and 202 and further include: an aryl- or heteryl-azo pigment having phenols, naphthols, anilines, heterocycles (e.g., pyrazine), open-chain-type active methylene compounds or the like as the coupling component (hereinafter referred to as a "coupler component"); an azomethine pigment having open-chain-type active methylene compounds or the like as the coupler component; and an anthrapyridone pigment.

In the case of preparing a magenta ink composition by using, as the colorant, C.I. Pigment Violet 19 or C.I. Pigment Red 122 in combination with other magenta pigments, the ratio between the total mass of C.I. Pigment Violet 19 and C.I. Pigment Red 122 and the mass of the magenta dye used in combination is not particularly limited but is preferably from 50:50 to 100:0, more preferably from 70:30 to 100:0, still more preferably from 80:20 to 100:0.

[Cyan Ink Composition]

The cyan ink composition for use in the present invention contains, as the colorant, at least one pigment selected from phthalocyanine pigments. Of these, C.I. Pigment Blue 15:3 and C.I. Pigment Blue 15:4 are preferred, and C.I. Pigment Blue 15:3 is most preferred.

In the ink set of the present invention, a dark cyan ink composition and a light cyan ink composition can be contained as the cyan ink composition. In the case where the ink set contains both a dark cyan ink composition and a light cyan ink composition, at least one of these two ink compositions preferably contains C.I. Pigment Blue 15:3 or C.I. Pigment Blue 15:4 as the colorant, and it is more preferred that the light cyan ink composition contains C.I. Pigment Blue 15:3 or C.I. Pigment Blue 15:4 as the colorant. Most preferably, both the dark cyan ink composition and the light cyan ink composition contain C.I. Pigment Blue 15:3 or C.I. Pigment Blue 15:4 as the colorant.

In the ink for inkjet recording of the present invention, the concentration of the cyan pigment in the cyan ink composition can be appropriately determined based on the color value of the pigment used. The contained amount of the colorant in the cyan ink composition is preferably from 2.5 to 6.5 mass %, more preferably from 3 to 6 mass %, and still more preferably from 4 to 5 mass %. In general, C.I. Pigment Blue 15:3 or C.I. Pigment Blue 15:4 is preferably contained in an amount of 0.2 to 10 mass % in the ink for inkjet recording.

In addition to C.I. Pigment Blue 15:3 or C.I. Pigment Blue 15:4, other cyan dyes may be used in combination as the colorant of the cyan ink composition used in the ink for inkjet recording of the present invention. In the case of using two or more kinds of colorants in combination, the total content of all colorants is preferably in the range above.

As for the cyan pigment which can be used in combination with the phthalocyanine pigment typified by C.I. Pigment Blue 15:3 and C.I. Pigment Blue 15:4, an arbitrary cyan pigment may be used. Specific preferred examples of the cyanine pigment include C.I. Pigment Blue 1, 2, 3, 15:1, 15:2, 15:6, 16, 22, 60, 80 and C.I. Violet Blue 4, 60 and further include: an aryl- or heteryl-azo dye having phenols, naphthols, anilines or the like as the coupler component; an azomethine pigment having phenols, naphthols, heterocycles (e.g., pyrrolotriazole) or the like as the coupling component; a cyanine pigment; a polymethine pigment such as oxonol and merocyanine pigments; a diphenylmethane pigment; a triphenylmethane dye; a carbonium pigment such as xanthene pigment; a phthalocyanine pigment; an anthraquinone pigment; and an indigo.thioindigo pigment.

The ink for inkjet recording of the present invention can be used not only for the formation of a monochromatic image but also for the formation of a full color image. For the formation of a full color image, a magenta ink composition, a cyan ink composition and a yellow ink composition can be used, and a black ink composition may be further used so as to adjust the tone.

[Black Ink Composition]

The contained amount of the colorant in the black ink composition is preferably from 1 to 5 mass %, more preferably from 1 to 3 mass %, and still more preferably from 1 to 2 mass %.

The black ink composition preferably used in the present invention contains carbon black (C.I. Pigment Black 7) as the colorant.

According to a preferred embodiment of the present invention, the amount of carbon black added is 3.0 mass % or less, preferably 2.5 mass % or less, more preferably 2.0 mass % or less, based on the black ink composition. By setting the amount of carbon black added to small, when used together with other ink compositions to print a color image on a recording medium, excellent black reproducibility is exhibited.

The ink set of the present invention may be constituted to contain a black ink composition, if desired. By containing a black ink composition in the ink set of the present invention, an image with good contrast can be formed on a recording medium. In the ink set of the present invention, the colorant used in the black ink composition is not limited to a colorant having a specific structure, but the difference in the light fastness or ozone resistance between other color ink compositions and the black ink composition is preferably small. The applicable black dye includes a dispersion of carbon black, other than disazo, trisazo and tetraazo dyes.

[Inkjet Recording Method]

The recording method of the present invention is a recording method of attaching the ink composition of the ink set on a recording medium to perform printing.

The recording method is preferably an inkjet recording method of ejecting a liquid droplet of the ink composition and attaching the liquid droplet on a recording medium to perform printing.

As for the inkjet recording method preferred in the present invention, energy is provided to an ink for inkjet recording to form an image on a known image-receiving material, that is, plain paper, resin-coated paper such as inkjet-exclusive paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947, film, electrophotographic common paper, cloth, glass, metal, ceramic or the like. Incidentally, those described in paragraphs 0093 to 0105 of JP-A-2003-306623 can be applied as the inkjet recording method preferred in the present invention.

In forming an image, a polymer latex compound may be used in combination for the purpose of imparting glossiness or water resistance or improving the weather resistance. The timing of imparting the polymer latex to an image-receiving material may be before or after imparting a colorant or simultaneously therewith. Accordingly, the site to which the polymer latex compound is added may be in the image-receiving paper or in the ink, or a liquid material of the polymer latex alone may be used. Specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944) and JP-A-2002-080759 (Japanese Patent Application No. 2000-268952) may be preferably used.

The image forming system preferred in the present invention, as one example, includes:

first step: a step of imparting a liquid composition for enhancing printability to a recording medium, second step: a step of imparting an ink composition to the recording medium imparted with the liquid composition, and other steps: other steps are not particularly limited and may be appropriately selected according to the purpose, and examples thereof include a drying/removing step and a heating/fixing step. The drying/removing step is not particularly limited except for drying and removing the ink solvent in the ink composition imparted to the recording medium and may be appropriately selected according to the purpose. The heating/fixing step is not particularly limited except for melting/heating a latex particle contained in the ink used for the above-described inkjet recording method and may be appropriately selected according to the purpose.

The image forming system preferred in the present invention, as another example, includes:

first step: a step of imparting a liquid composition for enhancing printability to an intermediate transfer material, second step: a step of imparting an ink composition to the intermediate transfer material imparted with the liquid composition, third step: a step of transferring an ink image formed on the intermediate transfer material, onto a recording medium, and other steps: other steps are not particularly limited and may be appropriately selected according to the purpose, and examples thereof include a drying/removing step and a heating/fixing step.

[Inkjet Recording Apparatus and Cartridge for Inkjet Recording]

The inkjet recording apparatus uses an ink for inkjet recording and is equipped with a recording head of ejecting the ink (and, if desired, a treating solution) on a recording medium surface, where the ink is ejected on the recording medium surface from the recording head and an image is thereby formed. The inkjet recording apparatus may comprise an ink tank for inkjet recording (hereinafter sometimes referred to as an "ink tank"), which can supply an ink to the recording head and is attachable to and removable from the main body of the inkjet recording apparatus. In this case, an ink is housed in the ink tank for inkjet recording.

As for the inkjet recording apparatus, a normal inkjet recording apparatus equipped with a printing system capable of using an ink for inkjet recording may be utilized. Other than this, the inkjet recording apparatus may be an apparatus where, if desired, a heater or the like for controlling the driving of ink is mounted or where an intermediate transfer mechanism is mounted and a mechanism of ejecting (printing) an ink and a treating solution on an intermediate and transferring the formed image onto a recording medium such as paper is equipped.

Also, as regards the ink tank for inkjet recording, a conventionally known ink tank may be utilized as long as it is attachable to and removable from the inkjet recording apparatus equipped with a recording head and has a construction capable of supplying an ink to the recording head in a state of being loaded in the inkjet recording apparatus.

The inkjet recording method (apparatus) preferably employs a thermal inkjet recording system or a piezo-inkjet recording system in view of the effect of improving bleed and intercolor bleed. In the case of thermal inkjet recording system, the ink is heated at the ejection and reduced in the viscosity, but since the temperature of the ink lowers on a recording medium, the viscosity abruptly rises. Therefore, this system has an effect of improving bleed and intercolor bleed. On the other hand, in the case of a piezo-inkjet system, a high-viscosity liquid can be ejected and the high-viscosity liquid can be kept from spreading in the paper surface direction on a recording medium, whereby an effect of improving bleed and intercolor bleed is provided.

The cartridge for inkjet recording contains an ink for inkjet recording. In an inkjet recording method (apparatus), the refill (supply) of an ink to the recording head is preferably performed from an ink tank (if desired, including a treating solution tank) filled with an ink liquid. The ink tank is preferably in a cartridge system attachable to and removable from the apparatus main body and by exchanging the ink tank in a cartridge system, the ink can be easily refilled.

[Recorded Material]

The recorded material of the present invention is a recorded material printed using the ink set of the present invention by a recording method of attaching an ink composition on a recording medium to perform printing. In particular, the recorded material where an image is formed using an ink set comprising a yellow ink composition containing an azo pigment of formula (2) or (3) is advantageous in that an image with excellent color reproducibility can be realized and the image fastness (particularly light fastness) is excellent.

EXAMPLES

The present invention is described in greater detail below by referring to Examples, but the present invention is not limited to these Examples. In Examples, "parts" indicates parts by mass.

The measurement of X-ray diffraction of the azo pigment used in the yellow ink composition was performed in accordance with Japanese Industrial Standards JIS K0131 (X-ray diffraction analysis rules) by using a powder X-ray diffraction measuring apparatus RINT 2500 (manufactured by Rigaku Corporation) with CuKα ray under the following conditions.

Measuring instrument used:

an automatic X-ray diffraction apparatus, RINT 2500, manufactured by Rigaku Corporation X-Ray tube: Cu Tube voltage: 55 kV Tube current: 280 mA Scan method: 2θ/θ scan Scan speed: 6 deg./min Sampling interval: 0.100 deg.

Start angle (2θ): 5 deg.

Stop angle (2θ): 55 deg.

Divergence slit: 2 deg.

Scattering slit: 2 deg.

Receiving slit: 0.6 mm

A vertical goniometer was used.

The azo pigment represented by formula (1) can be synthesized in accordance with the synthesis method of Pig.-1 described in Synthesis Example 1 of Pigment below.

Synthesis Example 1

(Synthesis of Azo Pigment)

The synthesis scheme of Azo Pigment (Pig.-1) is illustrated below.

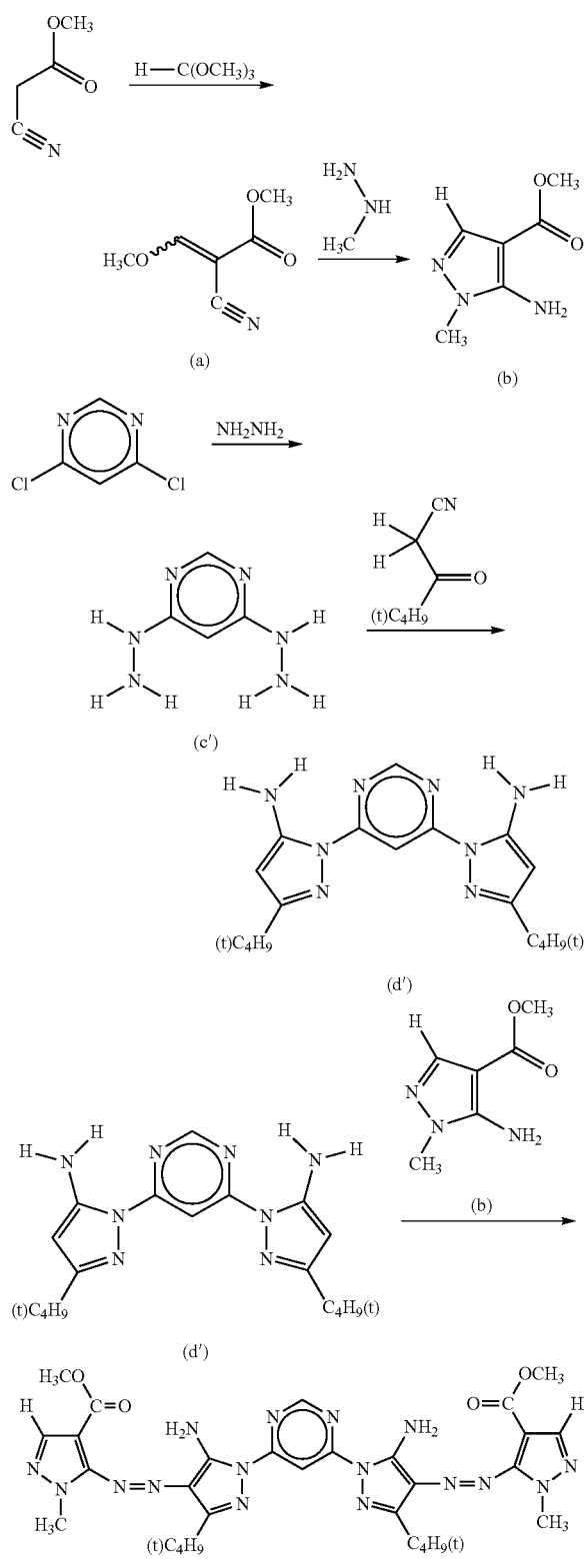

Pig.-1

(1) Synthesis of Intermediate (a)

To 29.7 g (0.3 mol) of methyl cyanoacetate, 42.4 g (0.4 mol) of trimethyl orthoformate, 20.4 g (0.2 mol) of acetic acid anhydride and 0.5 g of p-toluenesulfonic acid were added. The resulting mixture was heated at 110° C. (outer temperature) and stirred for 20 hours while distilling off low-boiling-point components produced from the reaction system. The obtained reaction solution was concentrated under reduced pressure and then subjected to silica gel column purification to obtain 14.1 g of Intermediate (a) (yellow powder, yield: 30%). The NMR measurement results of Intermediate (a) obtained are as follows.

$^1$H-NMR (300 MHz, CDCl$_3$) 7.96 (s, 1H), 4.15 (s, 3H), 3.81 (s, 3H).

(2) Synthesis of Intermediate (b)

To 7.4 mL (141 mmol) of methylhydrazine, 150 mL of isopropanol was added. The resulting mixture was cooled to 15° C. (inner temperature) and after gradually adding thereto 7.0 g (49.6 mmol) of Intermediate (a), the mixed solution was heated at 50° C. and stirred for 1 hour and 40 minutes. The obtained reaction solution was concentrated under reduced pressure and then subjected to silica gel column purification to obtain 10.5 g of Intermediate (b) (white powder, yield: 50%). The NMR measurement results of Intermediate (b) obtained are as follows.

$^1$H-NMR (300 MHz, CDCl$_3$) 7.60 (s, 1H), 4.95 (brs, 2H), 3.80 (s, 3H), 3.60 (s, 3H).

(3) Synthesis of Intermediate (c')

To 387 mL (7.98 mol) of hydrazine monohydrate, 298 mL of methanol was added. The resulting mixed solution was cooled to 10° C. (inner temperature), 149 g (1.00 mol) of 4,6-dichloropyrimidine was gradually added thereto (inner temperature: 20° C. or less), then the ice bath was removed, the temperature was raised to room temperature, and the solution was stirred at the same temperature for 30 minutes. Furthermore, the solution was heated to raise the temperature to an inner temperature of 60° C. and then stirred at the same temperature for 5 hours. After the completion of reaction, 750 mL of water was added, and the reaction solution was ice-cooled until the inner temperature became 8° C. The precipitated crystal was collected by filtration, washed by splashing with water, further washed by splashing with isopropanol and dried at room temperature for 36 hours to obtain 119 g of Intermediate (c') (white powder, yield: 84.5%). The NMR measurement results of Intermediate (c') obtained are as follows.

$^1$H-NMR (300 MHz, d-DMSO) 7.80 (s, 1H), 7.52 (s, 2H), 5.98 (s, 1H), 4.13 (s, 4H).

(4) Synthesis of Intermediate (d')

To 50 g (357 mmol) of Intermediate (c'), 128 mL of water was added. This mixture was stirred at room temperature and to the resulting suspension, 98.2 g (785 mmol) of pivaloylacetonitrile was added. After adjusting the pH to 3 by adding dropwise aqueous 12M hydrochloric acid at the same temperature, the mixed solution was heated until the inner temperature became 50° C. and stirred at the same temperature for 6 hours. After the completion of reaction, the pH was adjusted to 6.4 by adding an aqueous 8N potassium hydroxide solution for neutralization. The reaction solution was ice-cooled until the inner temperature became 10° C., and the precipitated crystal was collected by filtration and washed by splashing with water. The obtained crystal was dried at 60° C. under reduced pressure and after adding 30 mL of toluene to the obtained crude product, the product was dissolved under heating at 60° C. The resulting solution was left standing at room temperature for 12 hours, and the precipitated crystal was collected by filtration, washed by splashing with cooled toluene and then dried at 60° C. under reduced pressure to obtain 87.7 g of Intermediate (d') (white powder, yield: 69.3%). The NMR measurement results of Intermediate (d') obtained are as follows.

$^1$H-NMR (300 MHz, d-DMSO) 8.74 (s, 1H), 7.99 (s, 1H), 6.87 (s, 4H), 5.35 (s, 2H), 1.24 (s, 18H).

(5) Synthesis of Pigment (Pig.-1)

In a mixed solution containing 55 mL of acetic acid and 37 mL of propionic acid, 9.2 g of Intermediate (b) was dissolved at room temperature. The resulting solution was ice-cooled to an inner temperature of –3° C., and a 40 mass % sulfuric acid solution of nitrosyl sulfuric acid was added dropwise over 10 minutes at an inner temperature of –3° C. to 4° C. The resulting mixed solution was stirred for 1 hour at an inner temperature of 4° C. and after adding 0.2 g of urea, cooled to an inner temperature of –3° C. and further stirred for 10 minutes to obtain a diazonium salt solution. Separately, 10 g of Intermediate (d') was completely dissolved in 150 mL of acetone, the resulting solution was cooled to an inner temperature of 17° C., and the diazonium salt solution prepared above was added thereto over 25 minutes at an inner temperature in the range from –3° C. to 3° C. After the completion of addition, the mixed solution was stirred at 3° C. for 30 minutes, the ice bath was removed, and the temperature was raised to room temperature over 30 minutes. The solution was further stirred at room temperature for 30 minutes, and the obtained crystal was separated by filtration, then washed by splashing with 150 mL of acetone and further washed by splashing with 100 mL of water. The crystal obtained was, without drying it, suspended in 400 mL of water, and this suspension was adjusted to a pH of 5.7 by adding an aqueous 8N potassium hydroxide solution. Furthermore, the system was stirred at room temperature for 20 minutes, and the obtained crystal was separated by filtration, thoroughly washed by splashing with water and further washed by splashing with 80 mL of acetone. The crystal obtained was dried at room temperature for 12 hours.

The obtained crystal was suspended in 580 mL of acetone, and the suspension was stirred under reflux for 30 minutes. Thereafter, the solution was cooled at room temperature over 10 minutes, and the obtained crystal was separated by filtration and dried at room temperature for 5 hours to obtain 17.1 g of Pigment (Pig.-1). Yield: 88.5%.

The obtained Azo Pigment (Pig.-1) was observed with an eye by a transmission microscope (JEM-1010 Electron Microscope, manufactured by JEOL Ltd.), as a result, the length in the long axis direction of a primary particle was about 15 μm.

When the measurement of X-ray diffraction of Pigment (Pig.-1) was performed under the above-described conditions, characteristic X-ray diffraction peaks appeared at Bragg angles (2θ±0.2°) of 7.6° and 25.6°. FIG. 1 shows the CuKα characteristic X-ray diffraction diagram.

Synthesis Example 2

(Synthesis of Azo Pigment)

The synthesis scheme of Azo Pigment (Pig.-18) is illustrated below.

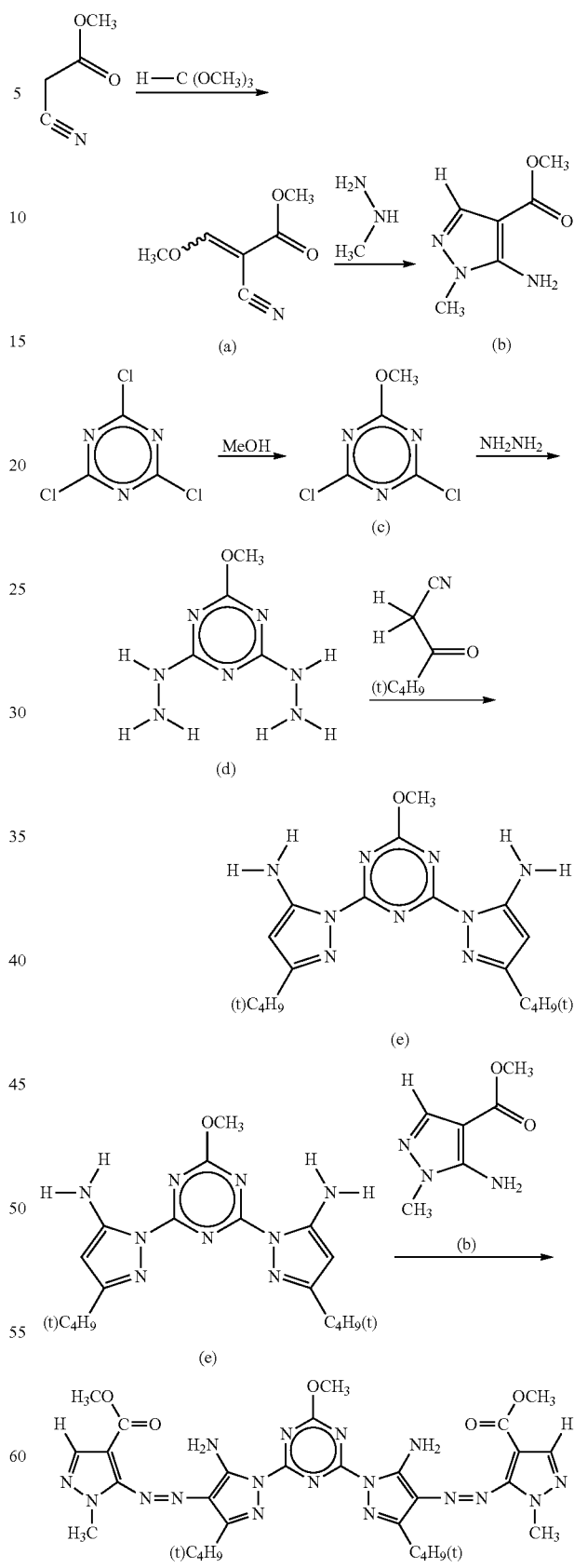

Pig. - 18

(1) Synthesis of Intermediate (a)

To 29.7 g (0.3 mol) of methyl cyanoacetate, 42.4 g (0.4 mol) of trimethyl orthoformate, 20.4 g (0.2 mol) of acetic acid anhydride and 0.5 g of p-toluenesulfonic acid were added. The resulting mixture was heated at 110° C. (outer temperature) and stirred for 20 hours while distilling off low-boiling-point components produced from the reaction system. The obtained reaction solution was concentrated under reduced pressure and then subjected to silica gel column purification to obtain 14.1 g of Intermediate (a) (yellow powder, yield: 30%). The NMR measurement results of Intermediate (a) obtained are as follows.

$^1$H-NMR (300 MHz, CDCl$_3$) 7.96 (s, 1H), 4.15 (s, 3H), 3.81 (s, 3H).

(2) Synthesis of Intermediate (b)

To 7.4 mL (141 mmol) of methylhydrazine, 150 mL of isopropanol was added. The resulting mixture was cooled to 15° C. (inner temperature) and after gradually adding thereto 7.0 g (49.6 mmol) of Intermediate (a), the mixed solution was heated at 50° C. and stirred for 1 hour and 40 minutes. The obtained reaction solution was concentrated under reduced pressure and then subjected to silica gel column purification to obtain 10.5 g of Intermediate (b) (white powder, yield: 50%). The NMR measurement results of Intermediate (b) obtained are as follows.

$^1$H-NMR (300 MHz, CDCl$_3$) 7.60 (s, 1H), 4.95 (brs, 2H), 3.80 (s, 3H), 3.60 (s, 3H).

(3) Synthesis of Intermediate (c)

To 1.1 L of methanol, 136 mL of water was added, and 182 g (2.17 mol) of sodium hydrogencarbonate was added thereto. The resulting mixture was stirred at room temperature, and 200 g (1.08 mol) of cyanuric chloride was added in parts at the same temperature. After the completion of addition, the inner temperature was raised to 30° C., and the mixed solution was stirred at the same temperature for 30 minutes. Thereafter, 500 mL of water was added, and the precipitated solid was separated by filtration, washed by splashing with 500 mL of water and with 300 mL of methanol, and then dried to obtain 168 g of Intermediate (c) (white powder, yield: 86.2%). The NMR measurement results of Intermediate (c) obtained are as follows.

$^1$H-NMR (300 MHz, CDCl$_3$) 4.14 (s, 3H).

(4) Synthesis of Intermediate (d)

To 363 mL (7.46 mol) of hydrazine monohydrate, 673 mL of water was added. The resulting mixed solution was cooled to 10° C. (inner temperature), 168 g (934 mmol) of Intermediate (c) was gradually added thereto (inner temperature: 20° C. or less), then the ice bath was removed, the temperature was raised to room temperature, and the solution was stirred at the same temperature for 30 minutes. The crystal precipitated from the reaction solution was collected by filtration, washed by splashing with 700 mL water and with 1 L of acetonitrile and dried to obtain a crude product (white powder) of Intermediate (d).

(5) Synthesis of Intermediate (e)

To the crude product of Intermediate (d), 480 mL of ethylene glycol was added. This mixture was stirred at room temperature and to the resulting suspension, 257 g (2.06 mol) of pivaloylacetonitrile was added. The system was heated until the inner temperature became 50° C. and after adjusting the pH to 3 by adding dropwise aqueous 12M hydrochloric acid at the same temperature, the mixed solution was heated until the inner temperature became 80° C. and then stirred for 3 hours. After the completion of reaction, the reaction solution was ice-cooled until the inner temperature became 8° C., and the precipitated crystal was collected by filtration, washed by splashing with water and then subjected to silica gel column purification to obtain 105 g of Intermediate (e) (white powder, yield in two steps: 29.2%). The NMR measurement results of Intermediate (e) obtained are as follows.

$^1$H-NMR (300 MHz, d-DMSO) 7.00 (s, 4H), 5.35 (s, 2H), 4.05 (s, 3H), 5.35 (s, 2H), 1.22 (s, 18H).

(6) Synthesis of Azo Pigment (Pig.-18)

A mixed solution containing 125 mL of acetic acid and 24 mL of sulfuric acid was ice-cooled to an inner temperature of 3° C., 26.4 g of nitrosyl sulfuric acid was added at the same temperature and subsequently, 11.6 g of Intermediate (b) was added in parts at the same temperature and dissolved. The resulting solution was stirred for 1 hour at the same temperature, 1.2 g of urea was added in parts at the same temperature, and the resulting mixed solution was stirred for 15 minutes at the same temperature to obtain a diazonium salt solution. Separately, 11.6 g of Intermediate (e) was completely dissolved in 405 mL of methanol at room temperature, the resulting solution was cooled to an inner temperature of −3° C. and at the same temperature, the diazonium salt solution prepared above was added thereto in parts such that the inner temperature became 3° C. or less. After the completion of addition, the mixed solution was stirred for 2 hours, the ice bath was removed, and the solution was further stirred at room temperature for 10 minutes. Thereafter, the precipitated crystal was separated by filtration, washed by splashing with 150 mL of methanol and further washed by splashing with 100 mL of water. The crystal obtained was, without drying it, suspended in 750 mL of water, and this suspension was adjusted to a pH of 5.7 by adding an aqueous 8N potassium hydroxide solution. Furthermore, the system was stirred at room temperature for 20 minutes, and the obtained crystal was separated by filtration, thoroughly washed by splashing with water and further washed by splashing with 80 mL of methanol. The crystal obtained was dried at room temperature for 12 hours.

The obtained crystal was suspended in a mixed solution containing 180 mL of dimethylacetamide and 180 mL of water, then, the inner temperature was raised to 85° C., and the suspension was stirred at the same temperature for 2 hours. The obtained crystal was separated by hot filtration and suspended in 300 mL of methanol, and the suspension was stirred at room temperature for 30 minutes. The obtained crystal was separated by filtration and dried at room temperature for 5 hours to obtain 19.5 g of Azo Pigment (Pig.-18). Yield: 90.3%.

The obtained Azo Pigment (Pig.-18) was observed with an eye by a transmission microscope (JEM-1010 Electron Microscope, manufactured by JEOL Ltd.), as a result, the length in the long axis direction of a primary particle was about 150 nm.

When the measurement of X-ray diffraction of Azo Pigment (Pig.-18) was performed under the above-described conditions, characteristic X-ray diffraction peaks appeared at Bragg angles (2θ±0.2°) of 7.2° and 25.9°.

Figure 2:
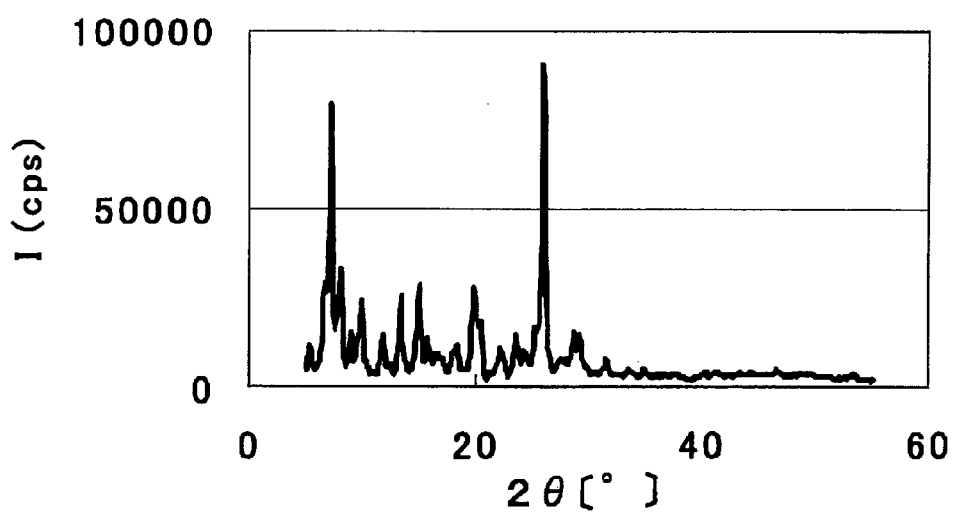
FIG. 2 is a CuKα characteristic X-ray diffraction diagram of the specific compound Pig. 18 synthesized in accordance with Synthesis Example 2.
Figure 5:
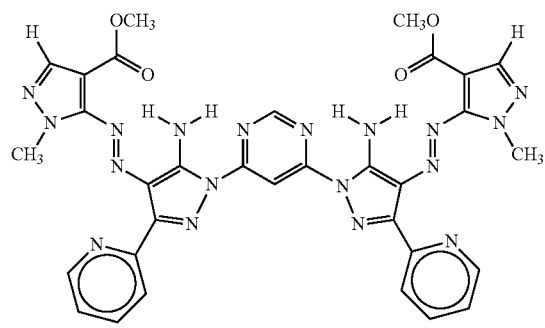
Figure 6:
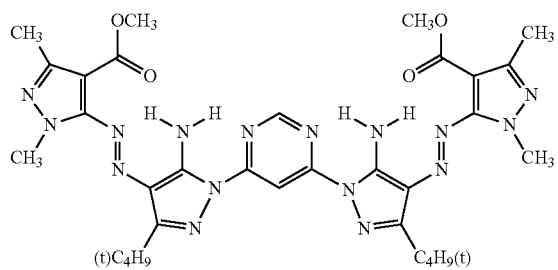
Figure 7:
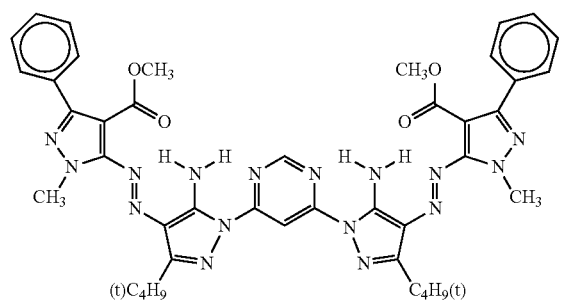
Figure 8:
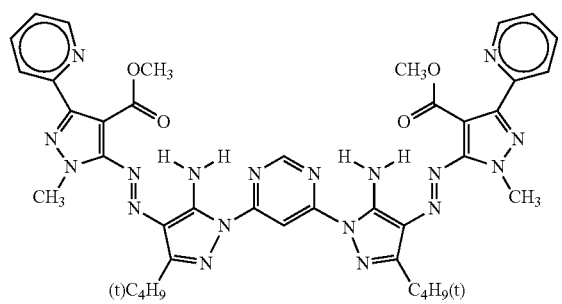
Figure 9:
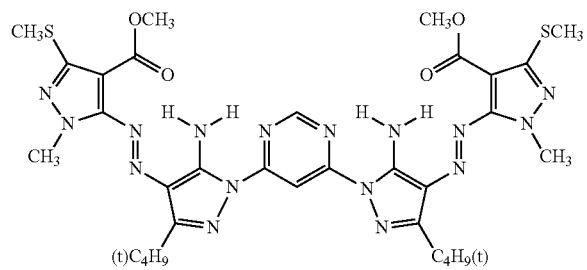
Figure 10:
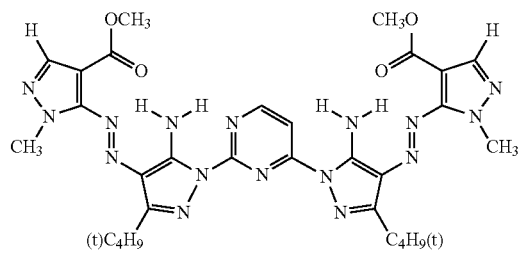
Figure 11:
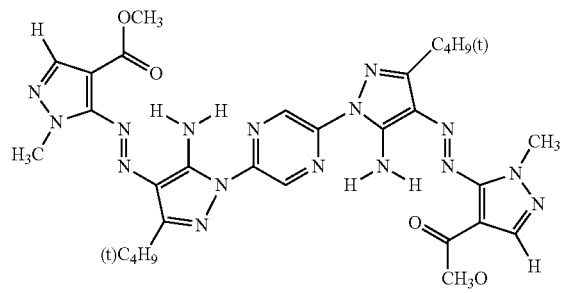
Figure 12:
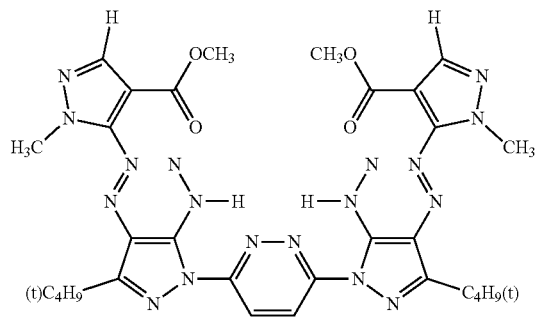
Figure 13:
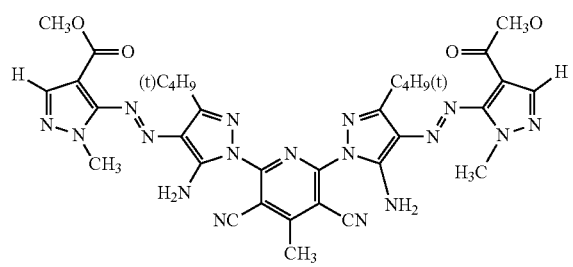
Figure 14:
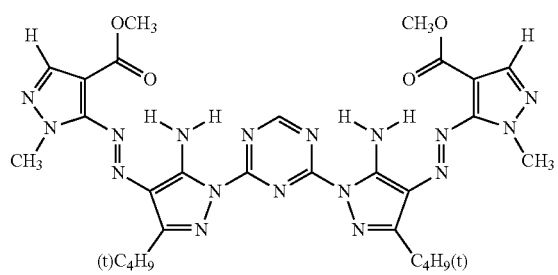
Figure 15:
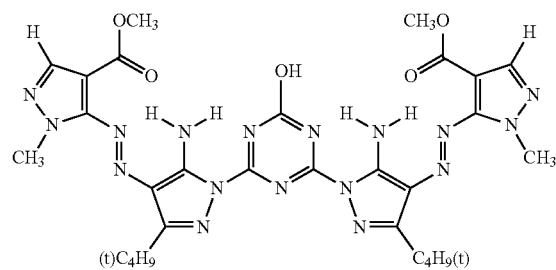
Figure 16:
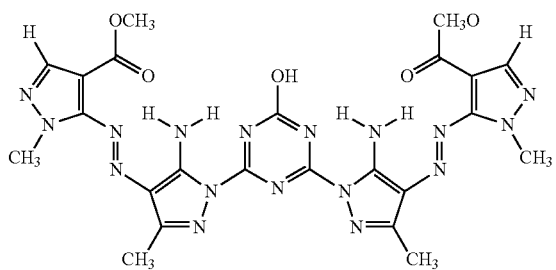
Figure 17:
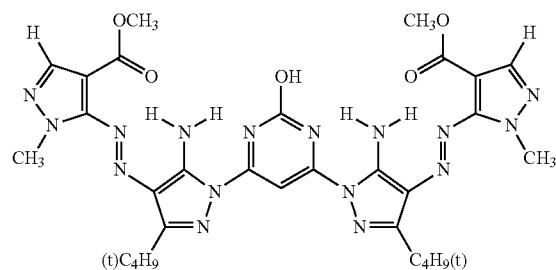
Figure 18:
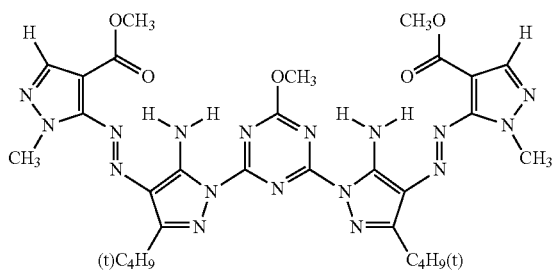
Figure 19:
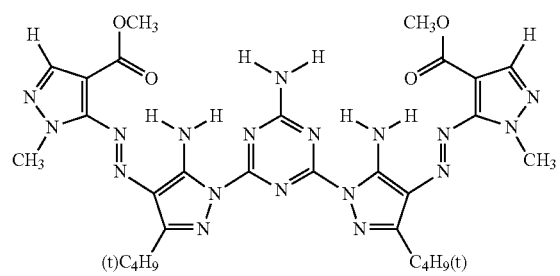
Figure 20:
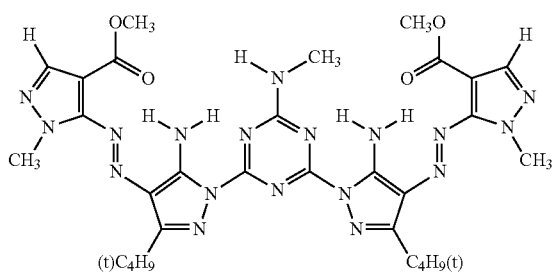
Figure 21:
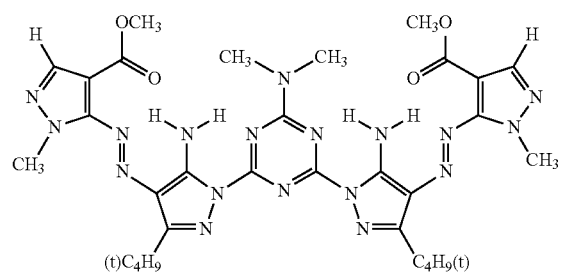
Figure 22:
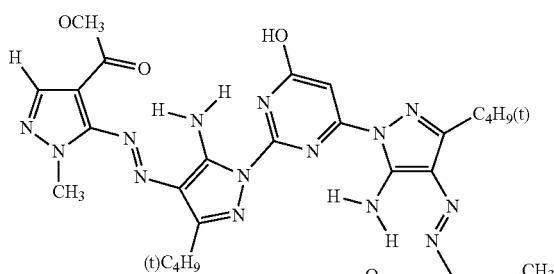
Figure 23:
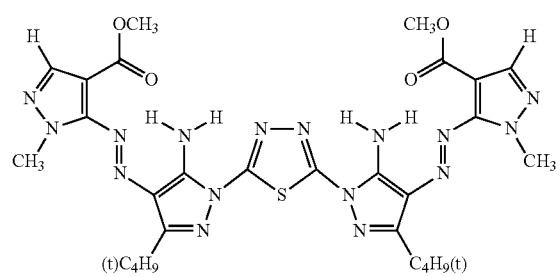
Figure 24:
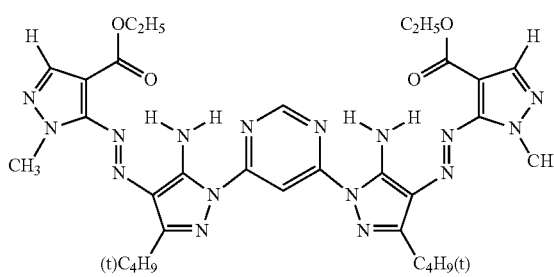
Figure 25:
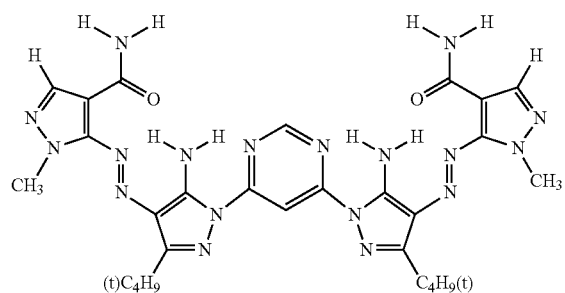
Figure 26:
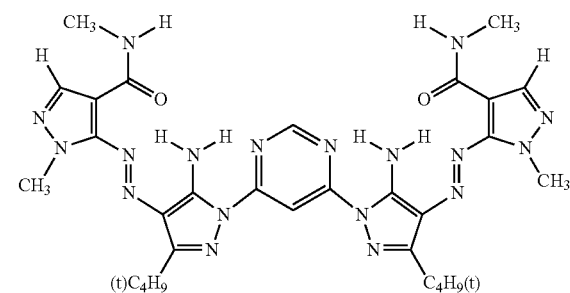
Figure 27:
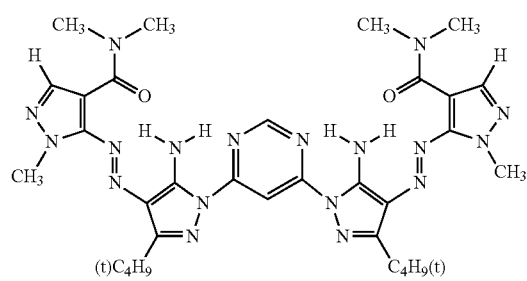
Figure 28:
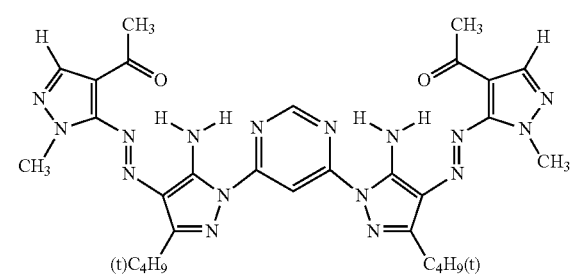
Figure 29:
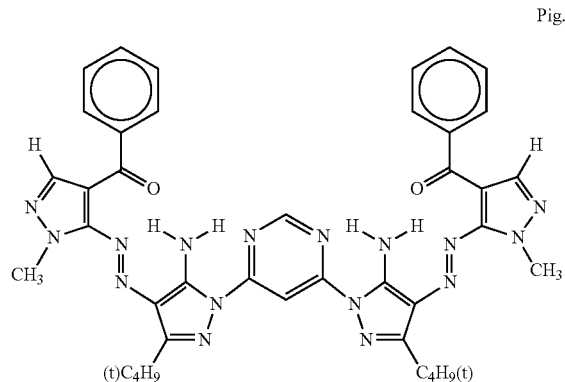
Figure 30:
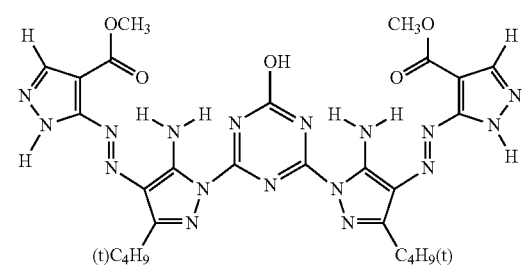
Figure 31:
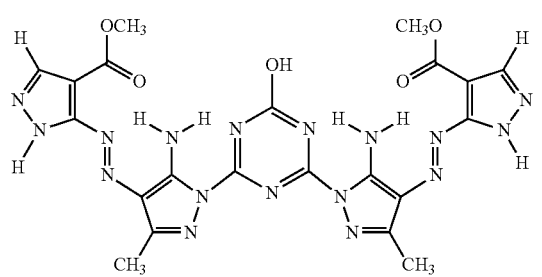
Figure 32:
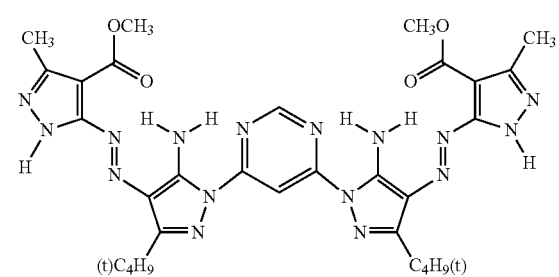
Figure 33:
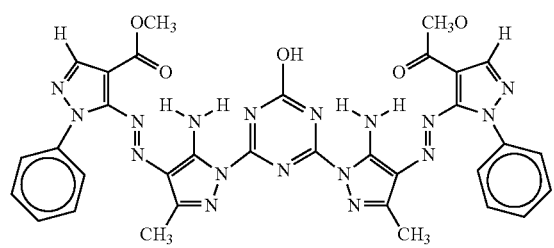
Figure 34:
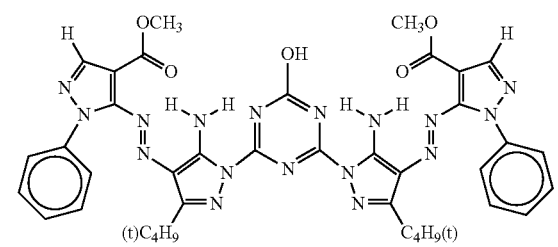
Figure 35:
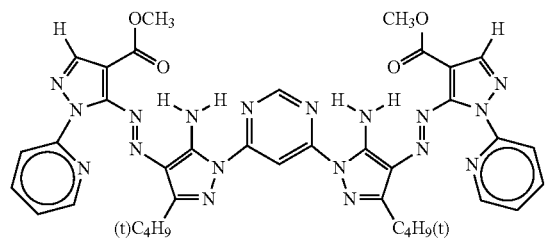
Figure 36:
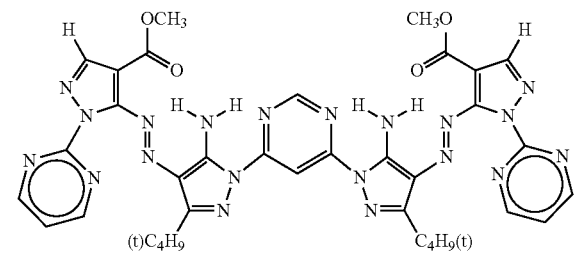
Figure 37:
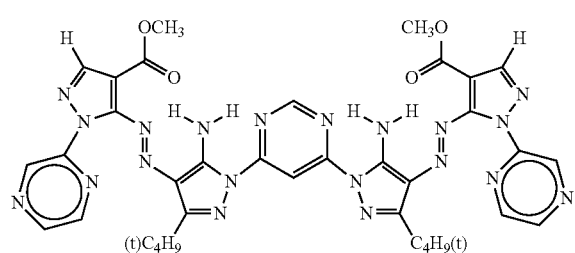
Figure 38:
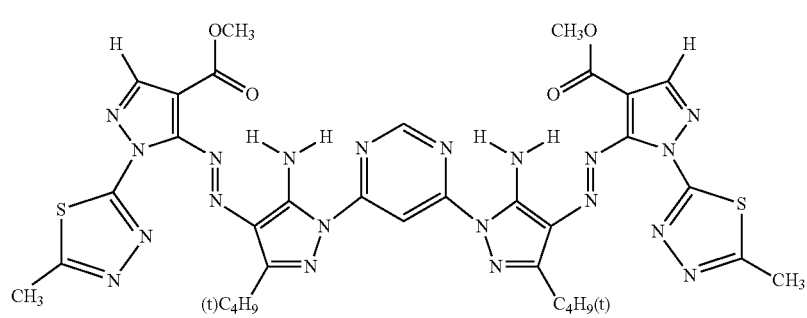
Figure 39:
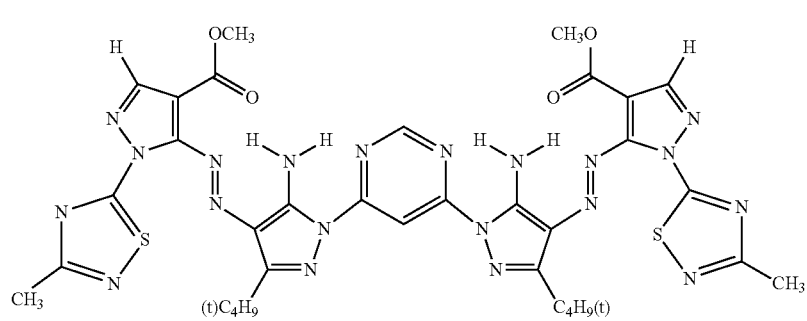
Figure 40:
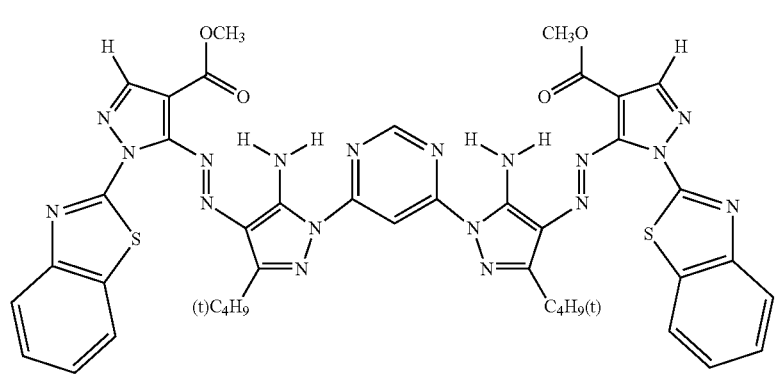

FIG. 2 shows the CuKα characteristic X-ray diffraction diagram.

Synthesis Example 3

(Synthesis of High-Molecular Vinyl Polymer)

The components in the following monomer composition were mixed to give a total amount of 100 parts by mass, 1 part by mass of 2,2'-azobis(2,4,-dimethylvaleronitrile) was further added as a polymerization initiator, and nitrogen gas replacement was thoroughly performed, whereby a synthesis mixed solution was obtained.

| | |
|---|---|
| Phenoxyethyl methacrylate | 55 parts by mass |
| Methyl methacrylate | 35 parts by mass |
| Methacrylic acid | 10 parts by mass |
| 2-Mercaptoethanol | 0.1 parts by mass |

Subsequently, while stirring 100 parts by mass of methyl ethyl ketone in a nitrogen atmosphere, the temperature was raised to 75° C. The synthesis mixed solution obtained above was added dropwise with stirring at 75° C. over 3 hours. The reaction was further allowed to proceed at 75° C. for 5 hours under stirring. Thereafter, the reaction synthesis product was naturally cooled to 25° C. and diluted by adding methyl ethyl ketone to have a solid content of 50%, whereby a high-molecular vinyl polymer solution having an average molecular weight of 41,000 was obtained.

Example 1

(Preparation of Water Dispersed Material of Pigment-Containing High Molecular Vinyl Polymer Particles)

An aqueous 5 mol/L sodium hydroxide solution was added for neutralization to 10 parts by mass of the obtained 50% high-molecular vinyl polymer solution. Here, the alkali was added in an amount large enough to completely neutralize a methacrylic acid or acrylic acid of the high-molecular vinyl monomer. 10 Parts by mass of Pigment Compound (Pig.-1) of the present invention was added, and the mixture was kneaded by a roll mill for 2 to 8 hours as needed. The kneaded material was dispersed in 100 parts by mass of ion-exchanged water and from the obtained dispersion, the organic solvent was completely removed at 55° C. under reduced pressure. Furthermore, the dispersion was concentrated by removing water to obtain a water dispersed material of pigment-containing high molecular vinyl polymer particles having a solid content concentration of 15 mass %.

(Preparation of Self-Dispersing Polymer Fine Particle)

Into a 2 liter-volume three-neck flask equipped with a stirrer, a thermometer, a reflux condenser and a nitrogen gas inlet tube, 350.0 g of methyl ethyl ketone was charged. The temperature was raised to 75° C. and while keeping the temperature in the reaction vessel at 75° C., a mixed solution containing 162.0 g of phenoxyethyl acrylate, 180.0 g of methyl methacrylate, 18.0 g of acrylic acid, 70 g of methyl ethyl ketone and 1.44 g of "V-601" (produced by Wako Pure Chemical Industries, Ltd.) was added dropwise at a constant rate so that the dropwise addition could be completed in 2 hours. After the completion of dropwise addition, a solution containing 0.72 g of "V-601" and 36.0 g of methyl ethyl ketone was added, and the resulting mixed solution was stirred at 75° C. for 2 hours. Furthermore, a solution containing 0.72 g of "V-601" and 36.0 g of isopropanol was added and after stirring at 75° C. for 2 hours, the temperature was raised to 85° C. and the stirring was further continued for 2 hours. The mass average molecular weight (Mw) of the obtained copolymer was 64,000 (calculated in terms of polystyrene by gel permeation chromatography (GPC); columns used: TSKgel SuperHZM-H, TSKgel SuperHZ4000 and TSKgel SuperHZ200 (manufactured by Tosoh Corporation)), and the acid value was 38.9 (mgKOH/g).

Next, 668.3 g of the polymer solution was weighed, 388.3 g of isopropanol and 145.7 ml of an aqueous 1 mol/L NaOH solution were added thereto, and the temperature in the reaction vessel was raised to 80° C. Subsequently, 720.1 g of distilled water was added dropwise at a rate of 20 ml/min to form a water dispersion. After keeping the temperature in the reaction vessel at 80° C. for 2 hours, at 85° C. for 2 hours and at 90° C. for 2 hours under atmospheric pressure, the pressure in the reaction vessel was reduced, and 913.7 g in total of isopropanol, methyl ethyl ketone and distilled water were distilled off to obtain a water dispersion (emulsion) of Self-Dispersing Polymer Fine Particle (B-01) having a solid content concentration of 28.0%.

| | |
|---|---|
| Water dispersion of pigment-containing high-molecular vinyl polymer particle above | 25 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 28 parts by mass |

These components were mixed to obtain Yellow Ink Composition 1.

The pH of the ink composition was measured by a pH meter, WM-50EG, manufactured by DKK-TOA Corporation and found to be 8.5.

As for the magenta ink and cyan ink, IC-42-Magenta Ink and IC-42-Cyan Ink produced by Seiko Epson Corporation were used. Image patterns were printed and evaluated for hue, print property, and image fastness as described later.

Example 2

Yellow Ink Composition 2 was obtained in the same manner as in Example 1 except for using Azo Pigment Composition (Pig.-2) in place of Azo Pigment Composition (Pig.-1) used in Example 1.

Example 3

Yellow Ink Composition 3 was obtained in the same manner as in Example 1 except for using Azo Pigment Composition (Pig.-18) in place of Azo Pigment Composition (Pig.-1) used in Example 1.

Example 4

Yellow Ink Composition 4 was obtained in the same manner as in Example 1 except for using Azo Pigment Composition (Pig.-24) in place of Azo Pigment Composition (Pig.-1) used in Example 1.

Example 5

Yellow Ink Composition 5 was obtained in the same manner as in Example 1 except for using Azo Pigment Composition (Pig.-46) in place of Azo Pigment Composition (Pig.-1) used in Example 1.

Example 6

Yellow Ink Composition 6 was obtained in the same manner as in Example 1 except for using Azo Pigment Composition (Pig.-47) in place of Azo Pigment Composition (Pig.-1) used in Example 1.

Example 7

Image patterns were printed in the same manner as in Example 1 except for using Magenta Ink Composition 1 prepared with the following composition in place of IC-42-Magenta Ink used in Example 1 and evaluated for hue, print property, and image fastness.

<Magenta Ink Composition 1>

| | |
|---|---|
| Glycerin | 10.0 mass % |
| 4-methyl-1,2-pentanediol | 8.0 mass % |
| Triethanolamine | 0.9 mass % |
| BYK-UV3510 (manufactured by BYK Additives & Instruments) | 0.1 mass % |
| C.I. Pigment violet 19 | 5.0 mass % |
| Styrene-acrylic acid copolymer | 2.0 mass % |
| Deionized water | remaining amount |
| | (100.0 mass % in total) |

Example 8

Image patterns were printed in the same manner as in Example 1 except for using Magenta Ink Composition 2 prepared with the following composition in place of IC-42-Magenta Ink used in Example 1 and evaluated for hue, print property, and image fastness.

<Magenta Ink Composition 2>

| | |
|---|---|
| Glycerin | 10.0 mass % |
| 4-methyl-1,2-pentanediol | 8.0 mass % |
| Triethanolamine | 0.9 mass % |
| BYK-UV3510 (manufactured by BYK Additives & Instruments) | 0.1 mass % |
| Solid solution of C.I. Pigment violet 19 (3.0 mass %) and C.I. Pigment red 122 (1.9 mass %) | |
| Styrene-acrylic acid copolymer | 2.0 mass % |
| Deionized water | remaining amount |
| | (100.0 mass % in total) |

Example 9

Image patterns were printed in the same manner as in Example 1 except for using Cyan Ink Composition 1 prepared with the following composition in place of IC-42-Cyan Ink used in Example 1 and evaluated for hue, print property, and image fastness.

<Cyan Ink Composition 1>

| | |
|---|---|
| Glycerin | 10.0 mass % |
| 4-methyl-1,2-pentanediol | 8.0 mass % |
| Triethanolamine | 0.9 mass % |
| BYK-UV3510 (manufactured by BYK Additives & Instruments) | 0.1 mass % |
| C.I. Pigment blue 15:3 | 4.0 mass % |
| Styrene-acrylic acid copolymer | 1.6 mass % |
| Deionized water | remaining amount |
| | (100.0 mass % in total) |

Example 10

Image patterns were printed in the same manner as in Example 1 except for using Cyan Ink Composition 2 prepared with the following composition in place of IC-42-Cyan Ink used in Example 1 and evaluated for hue, print property, and image fastness.

<Cyan Ink Composition 2>

| | |
|---|---|
| Glycerin | 10.0 mass % |
| 4-methyl-1,2-pentanediol | 8.0 mass % |
| Triethanolamine | 0.9 mass % |
| BYK-UV3510 (manufactured by BYK Additives & Instruments) | 0.1 mass % |
| C.I. Pigment blue 15:4 | 4.0 mass % |
| Styrene-acrylic acid copolymer | 1.6 mass % |
| Deionized water | remaining amount |
| | (100.0 mass % in total) |

Comparative Example 1

Comparative Yellow Ink Composition 1 was obtained in the same manner as in Example 1 except for using C.I. Pigment Yellow 74 (Iralite YELLOW GO produced by Ciba Specialty Chemicals Corp.) in place of Azo Pigment Composition (Pig.-1) used in Example 1.

Comparative Example 2

Comparative Yellow Ink Composition 2 was obtained in the same manner as in Example 1 except for using C.I. Pigment Yellow 155 (INKJET YELLOW 4G VP2532 produced by Clariant K.K.) in place of Azo Pigment Composition (Pig.-1) used in Example 1.

Comparative Example 3

Comparative Yellow Ink Composition 3 was obtained in the same manner as in Example 1 except for using C.I. Pigment Yellow 128 (CROMOPHTAL YELLOW 8GN produced by Ciba Specialty Chemicals Corp.) in place of Azo Pigment Composition (Pig.-1) used in Example 1.

Each of the ink solutions of Examples 1 to 10 and Comparative Examples 1, 2 and 3 was charged into the cartridge for ink solution of an inkjet printer, PX-V630, manufactured by Seiko Epson Corporation, and a yellow monochromatic image pattern stepwise changed in the density was printed using an image-receiving sheet, Photo Crispia <Ko-Kotaku>, produced by Seiko Epson Corporation under the conditions of color setting: no color correction and printing quality: photo and evaluated for hue, print property and image fastness.

As for the magenta ink and cyan ink, IC-42-Magenta Ink and IC-42-Cyan Ink produced by Seiko Epson Corporation were used.

Monochromatic image patterns comprising yellow, magenta, cyan and black, respectively, and stepwise changed in the density so that the OD value of each color could become from 0.7 to 1.8, and green and red image patterns were printed and evaluated for hue, print property, image fastness (light fastness and ozone gas resistance) and image quality.

[Test Method for Hue]

A yellow monochromatic image pattern changed in the density was printed, and the reflection density of the recorded material was measured using a spectrophotometer, GRETAG SPM-50 (manufactured by GRETAG).

The measurement conditions were a light source of D50, no light source filter, a white standard of absolute white and a viewing angle of 2°, and the L* value, a* value and b* value specified by CIE (International Commission on Illumination) were obtained. The results are shown in Table 1.

[Criteria for Judgment]

Rating A: When $a^*=0$, $b^* \geq 95$ and when $b^*=95$, $a^* \leq -5$; and when $-5 \leq a^* \leq 0$, $b^* \leq 30$ and when $60 \leq b^* \leq 95$, $a^* \leq -10$.

Rating B: Either one out of the conditions in rating A is not satisfied.

Rating C: Both of the conditions in rating A are not satisfied.

Furthermore, the following evaluation of print property was performed. The results obtained are shown as "Coloring Power" in Table 1.

[Evaluation of Coloring Power]

The yellow pigment ink solution prepared above was charged into the cartridge for yellow ink solution of an inkjet printer, PX-V630, manufactured by Seiko Epson Corporation, and a yellow solid print pattern was produced using an image-receiving sheet, Photo Crispia <Ko-Kotaku>, produced by Seiko Epson Corporation under the conditions of color setting: no color correction and printing quality: photo. The coloring power was rated A when $2.0 \leq ODmax$ in terms of single color density, rated B when $1.8 \leq ODmax < 2.0$, rated C when $1.5 \leq ODmax < 1.8$ and rated D when $ODmax < 1.5$.

[Test Method for Light Fastness]

Xenon light (100,000 lux) was irradiated on an image for 42 days by using a weather meter (manufactured by Atlas). The OD value of each of colors (yellow, red, green) recorded in each printed material was measured using a reflection densitometer (X-Rite 310TR) every time a fixed period passed from the initiation of irradiation. As for the reflection density, 3 points of 0.7, 1.0 and 1.8 were measured.

The residual ratio of optical density (ROD) was determined from the obtained results according to the formula: $ROD(\%) = (D/D_0) \times 100$.

(In the formula, D indicates the OD value after the exposure test, and $D_0$ indicates the OD value before the exposure test.)

Based on the test results above, the light fatness of each of colors recorded in the recorded material was ranked on a scale of A to D.

[Criteria for Judgment]

Rating A: ROD after 42 days from the initiation of test is 85% or more at all points of density.

Rating B: ROD after 42 days from the initiation of test is less than 85% at any one point of density.

Rating C: ROD after 42 days from the initiation of test is less than 85% at any two points of density.

Rating D: ROD after 42 days from the initiation of test is less than 85% at all points of density.

In this test, a recorded material undergoing little reduction in ROD even when exposed to light for a long period time is excellent. The results obtained are shown as "Light Fastness" in Table 1.

[Test Method for Ozone Gas Fastness 1]

The recorded material was exposed to an ozone gas for 21 days under the conditions of an ozone gas concentration being set to 5 ppm (25° C., 50% RH). The ozone gas concentration was set using an ozone gas monitor (Model: OZG-EM-01) manufactured by APPLICS. The OD value of each of colors recorded in each printed material was measured using a reflection densitometer (X-Rite 310TR) every time a fixed period passed from the initiation of irradiation. As for the reflection density, 3 points of 0.7, 1.0 and 1.8 were measured.

The residual ratio of optical density (ROD) was determined from the obtained results according to the formula: $ROD(\%) = (D/D_0) \times 100$.

(In the formula, D indicates the OD value after the exposure test, and $D_0$ indicates the OD value before the exposure test.)

Based on the test results above, the ozone gas fastness of each of colors recorded in the recorded material was ranked on a scale of A to D by using the following criteria for judgment.

[Criteria for Judgment]

Rating A: ROD after 21 days from the initiation of test is 85% or more at all points of density.

Rating B: ROD after 21 days from the initiation of test is less than 85% at any one point of density.

Rating C: ROD after 21 days from the initiation of test is less than 85% at any two points of density.

Rating D: ROD after 21 days from the initiation of test is less than 85% at all points of density.

In this test, a recorded material undergoing little reduction in ROD even when exposed to light for a long period time is excellent. The results obtained are shown as "Ozone Gas Fastness" in Table 1.

TABLE 1

| Ink Composition (Ink Set) | Colorant (yellow pigment) | Hue, single yellow color | Coloring Power, single yellow color | Light Fastness | | | Ozone Gas Fastness | | |
|---|---|---|---|---|---|---|---|---|---|
| | | | | Yellow | Red | Green | Yellow | Red | Green |
| Example 1 | Pig. 1 | A | B | A | A | A | A | B | B |
| Example 2 | Pig. 2 | A | B | A | A | A | A | B | B |
| Example 3 | Pig. 18 | A | A | B | A | A | A | B | B |
| Example 4 | Pig. 24 | A | B | A | A | A | A | B | B |
| Example 5 | Pig. 44 | A | A | B | A | A | A | B | B |
| Example 6 | Pig. 45 | A | A | B | A | A | A | B | B |
| Example 7 | Pig. 1 | A | B | A | A | A | A | B | B |
| Example 8 | Pig. 1 | A | B | A | A | A | A | B | B |
| Example 9 | Pig. 1 | A | B | A | A | A | A | B | B |

TABLE 1-continued

| Ink Composition (Ink Set) | Colorant (yellow pigment) | Hue, single yellow color | Coloring Power, single yellow color | Light Fastness | | | Ozone Gas Fastness | | |
|---|---|---|---|---|---|---|---|---|---|
| | | | | Yellow | Red | Green | Yellow | Red | Green |
| Example 10 | Pig. 1 | A | B | A | A | A | A | B | B |
| Comparative Example 1 (Comparative Yellow Ink 1) | C.I. PY-74 | A | B | D | D | D | B | C | D |
| Comparative Example 2 (Comparative Yellow Ink 2) | C.I. PY-155 | B | C | C | C | C | B | C | D |
| Comparative Example 3 (Comparative Yellow Ink 3) | C.I. PY-128 | C | D | B | B | B | B | C | D |

Example 11

Gray image pattern was printed in the same manner as in Example 1 except for using four-color ink set which uses Yellow Ink Composition 1 of Example 1, Magenta Ink Composition 1 of Example 7, Cyan Ink Composition 1 of Example 9 and Black Ink Composition prepared with the following composition in place of three-color ink set used in Example 1. The gray image formed by a composite in which three inks of yellow, magenta and cyan each having initial concentration of OD≈0.7 were combined was evaluated at a part where the initial concentration satisfied OD≈0.7 for light fastness and ozone gas fastness. The results obtained are shown as "Light Fastness" and "Ozone Gas Fastness" in Table 2.

<Black Ink Composition>

| | |
|---|---|
| Glycerin | 10.0 mass % |
| 4-methyl-1,2-pentanediol | 8.0 mass % |
| Triethanolamine | 0.9 mass % |
| BYK-UV3510 (manufactured by BYK Additives & Instruments) | 0.1 mass % |
| C.I. Pigment black 7 (Carbon Black) | 1.5 mass % |
| Styrene-acrylic acid copolymer | 0.8 mass % |
| Deionized water | remaining amount |
| | (100.0 mass % in total) |

Example 12

Image pattern was printed in the same manner as in Example 11 except for using Magenta Ink Composition 2 used in Example 8 in place of Magenta Ink Composition 1 used in Example 11 and evaluated for image fastness. The results obtained are shown as "Light Fastness" and "Ozone Gas Fastness" in Table 2.

Example 13

Image pattern was printed in the same manner as in Example 11 except for using Cyan Ink Composition 2 used in Example 10 in place of Cyan Ink Composition 1 used in Example 11 and evaluated for image fastness. The results obtained are shown as "Light Fastness" and "Ozone Gas Fastness" in Table 2.

Example 14

Image pattern was printed in the same manner as in Example 11 except for using Magenta Ink Composition 2 used in Example 12 and Cyan Ink Composition 2 used in Example 13 in place of Magenta Ink Composition 1 and Cyan Ink Composition 1 used in Example 11 and evaluated for image fastness. The results obtained are shown as "Light Fastness" and "Ozone Gas Fastness" in Table 2.

Example 15

Image pattern was printed in the same manner as in Example 11 except for replacing yellow pigment Pig.1 of Yellow Ink Composition 1 used in Example 11 with Pig.2 and evaluated for image fastness. The results obtained are shown as "Light Fastness" and "Ozone Gas Fastness" in Table 2.

Example 16

Image pattern was printed in the same manner as in Example 11 except for replacing yellow pigment Pig.1 of Yellow Ink Composition 1 used in Example 11 with Pig.12 and evaluated for image fastness. The results obtained are shown as "Light Fastness" and "Ozone Gas Fastness" in Table 2.

Example 17

Image pattern was printed in the same manner as in Example 11 except for replacing yellow pigment Pig.1 of Yellow Ink Composition 1 used in Example 11 with Pig.18 and evaluated for image fastness. The results obtained are shown as "Light Fastness" and "Ozone Gas Fastness" in Table 2.

Example 18

Image pattern was printed in the same manner as in Example 11 except for replacing yellow pigment Pig.1 of Yellow Ink Composition 1 used in Example 11 with Pig.24 and evaluated for image fastness. The results obtained are shown as "Light Fastness" and "Ozone Gas Fastness" in Table 2.

Example 19

Image pattern was printed in the same manner as in Example 11 except for replacing yellow pigment Pig.1 of Yellow Ink Composition 1 used in Example 11 with Pig.44 and evaluated for image fastness. The results obtained are shown as "Light Fastness" and "Ozone Gas Fastness" in Table 2.

Example 20

Image pattern was printed in the same manner as in Example 11 except for replacing yellow pigment Pig.1 of Yellow Ink Composition 1 used in Example 11 with Pig.45 and evaluated for image fastness. The results obtained are shown as "Light Fastness" and "Ozone Gas Fastness" in Table 2.

Comparative Example 11

Image pattern was printed in the same manner as in Example 11 except for using I.C. Pigment Yellow 74 (Iralite YELLOW GO produced by Ciba Specialty Chemicals Corp.) in place of Yellow Ink Composition 1 used in Example 11 and evaluated for image fastness. The results obtained are shown as "Light Fastness" and "Ozone Gas Fastness" in Table 2.

[Test Method for Light Fastness]

Xenon light (100,000 lux) was irradiated on an image for 42 days by using a weather meter (manufactured by Atlas). The OD value of gray color recorded in each printed material was measured using a reflection densitometer (X-Rite 310TR) every time a fixed period passed from the initiation of irradiation. Incidentally, reflection density of 0.7 was measured.

The residual ratio of optical density (ROD) was determined from the obtained results according to the formula: ROD $(\%) = (D/D_0) \times 100$.

(In the formula, D indicates the OD value after the exposure test, and $D_0$ indicates the OD value before the exposure test.)

Based on the test results above, the light fatness of gray color recorded in the recorded material was ranked on a scale of A to D.

[Criteria for Judgment]

Rating A: ROD after 42 days from the initiation of test is 85% or more even at remaining density.

Rating B: ROD after 42 days from the initiation of test is 70% or more and less than 85% at remaining density.

Rating C: ROD after 42 days from the initiation of test is 50% or more and less than 70% at remaining density.

Rating D: ROD after 42 days from the initiation of test is less than 50% at remaining density.

In this test, a recorded material undergoing little reduction in ROD even when exposed to light for a long period time is excellent. The results obtained are shown as "Light Fastness" in Table 2.

[Test Method for Ozone Gas Fastness 2]

The recorded material was exposed to an ozone gas for 35 days under the conditions of an ozone gas concentration being set to 5 ppm (25° C., 50% RH). The ozone gas concentration was set using an ozone gas monitor (Model: OZG-EM-01) manufactured by APPLICS. The OD value of gray color recorded in each printed material was measured using a reflection densitometer (X-Rite 310TR) every time a fixed period passed from the initiation of irradiation. Incidentally, reflection density of 0.7 was measured.

The residual ratio of optical density (ROD) was determined from the obtained results according to the formula: ROD $(\%) = (D/D_0) \times 100$.

(In the formula, D indicates the OD value after the exposure test, and $D_0$ indicates the OD value before the exposure test.)

Based on the test results above, the ozone gas fastness of gray color recorded in the recorded material was ranked on a scale of A to D by using the following criteria for judgment.

[Criteria for Judgment]

Rating A: ROD after 35 days from the initiation of test is 85% or more at remaining density.

Rating B: ROD after 35 days from the initiation of test is 70% or more and less than 85% at remaining density.

Rating C: ROD after 35 days from the initiation of test is 50% or more and less than 70% at remaining density.

Rating D: ROD after 35 days from the initiation of test is less than 50% at remaining density.

In this test, a recorded material undergoing little reduction in ROD even when exposed to light for a long period time is excellent. The results obtained are shown as "Ozone Gas Fastness" in Table 2.

TABLE 2

| Ink Composition (Ink Set) | Colorant (yellow pigment) | Colorant (magenta pigment) | Colorant (cyan pigment) | Colorant (black pigment) | Light Fastness OD≈0.7 | Ozone Gas Fastness OD≈0.7 |
|---|---|---|---|---|---|---|
| Example 11 | Pig. 1 | C.I. PV 19 | C.I. PB 15:3 | C.I. PB 7 | A | B |
| Example 12 | Pig. 1 | C.I. PV 19 C.I. PR 122 | C.I. PB 15:3 | C.I. PB 7 | A | B |
| Example 13 | Pig. 1 | C.I. PV 19 | C.I. PB 15:4 | C.I. PB 7 | A | B |
| Example 14 | Pig. 1 | C.I. PV 19 C.I. PR 122 | C.I. PB 15:4 | C.I. PB 7 | A | B |
| Example 15 | Pig. 2 | C.I. PV 19 | C.I. PB 15:3 | C.I. PB 7 | A | B |
| Example 16 | Pig. 12 | C.I. PV 19 | C.I. PB 15:3 | C.I. PB 7 | A | B |
| Example 17 | Pig. 18 | C.I. PV 19 | C.I. PB 15:3 | C.I. PB 7 | B | B |
| Example 18 | Pig. 24 | C.I. PV 19 | C.I. PB 15:3 | C.I. PB 7 | B | B |
| Example 19 | Pig. 44 | C.I. PV 19 | C.I. PB 15:3 | C.I. PB 7 | B | B |
| Example 20 | Pig. 45 | C.I. PV 19 | C.I. PB 15:3 | C.I. PB 7 | B | B |
| Comparative Example 11 | C.I. PY-74 | C.I. PV 19 | C.I. PB 15:3 | C.I. PB 7 | D | D |

Example 21

Yellow Ink Composition 21 was prepared in the same manner as in Example 1 except for changing the composition of the Yellow Ink Composition 1 which uses aqueous yellow pigment dispersion used in Example 1 into the following composition. Then image patterns were printed and evaluated for hue, print property and image fastness.

| | |
|---|---|
| Aforementioned water dispersion of pigment-containing high-molecular vinyl polymer particle | 30 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |

| | |
|---|---|
| Water dispersion of Self-Dispersing Polymer Fine Particle (B-01) | 15 parts by mass |
| Ion-exchanged water | 23 parts by mass |

These components were mixed to obtain Yellow Ink Composition 21.

The pH of the ink composition was measured by a pH meter, WM-50EG, manufactured by DKK-TOA Corporation and found to be 8.8.

As for the magenta ink and cyan ink, IC-42-Magenta Ink and IC-42-Cyan Ink produced by Seiko Epson Corporation were used to prepare an ink set.

Example 22

Yellow Ink Composition 22 was prepared in the same manner as in Example 1 except for changing the composition of the Yellow Ink Composition 1 which uses aqueous yellow pigment dispersion used in Example 1 into the following composition. Then image patterns were printed and evaluated for hue, print property and image fastness.

| | |
|---|---|
| Aforementioned water dispersion of pigment-containing high-molecular vinyl polymer particle | 35 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 18 parts by mass |

These components were mixed to obtain Yellow Ink Composition 22. The pH of the ink composition was measured by a pH meter, WM-50EG, manufactured by DKK-TOA Corporation and found to be 8.7.

As for the magenta ink and cyan ink, IC-42-Magenta Ink and IC-42-Cyan Ink produced by Seiko Epson Corporation were used to prepare an ink set.

Example 23

Yellow Ink Composition 23 was prepared in the same manner as in Example 1 except for changing the composition of the Yellow Ink Composition 1 which uses aqueous yellow pigment dispersion used in Example 1 into the following composition. Then image patterns were printed and evaluated for hue, print property and image fastness.

| | |
|---|---|
| Aforementioned water dispersion of pigment-containing high-molecular vinyl polymer particle | 40 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 13 parts by mass |

These components were mixed to obtain Yellow Ink Composition 23. The pH of the ink composition was measured by a pH meter, WM-50EG, manufactured by DKK-TOA Corporation and found to be 8.8.

As for the magenta ink and cyan ink, IC-42-Magenta Ink and IC-42-Cyan Ink produced by Seiko Epson Corporation were used to prepare an ink set.

Example 24

Yellow Ink Composition 24 was prepared in the same manner as in Example 1 except for changing the composition of the Yellow Ink Composition 1 which uses aqueous yellow pigment dispersion used in Example 1 into the following composition. Then image patterns were printed and evaluated for hue, print property and image fastness.

| | |
|---|---|
| Aforementioned water dispersion of pigment-containing high-molecular vinyl polymer particle | 45 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 8 parts by mass |

These components were mixed to obtain Yellow Ink Composition 24.

The pH of the ink composition was measured by a pH meter, WM-50EG, manufactured by DKK-TOA Corporation and found to be 9.0.

As for the magenta ink and cyan ink, IC-42-Magenta Ink and IC-42-Cyan Ink produced by Seiko Epson Corporation were used to prepare an ink set.

Example 25

Yellow Ink Composition 25 was prepared in the same manner as in Example 1 except for changing the composition of the Yellow Ink Composition 1 which uses aqueous yellow pigment dispersion used in Example 1 into the following composition. Then image patterns were printed and evaluated for hue, print property and image fastness.

| | |
|---|---|
| Aforementioned water dispersion of pigment-containing high-molecular vinyl polymer particle | 50 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |

| | |
|---|---|
| Water dispersion of Self-Dispersing Polymer Fine Particle (B-01) | 15 parts by mass |
| Ion-exchanged water | 3 parts by mass |

These components were mixed to obtain Yellow Ink Composition 25.

The pH of the ink composition was measured by a pH meter, WM-50EG, manufactured by DKK-TOA Corporation and found to be 9.1.

As for the magenta ink and cyan ink, IC-42-Magenta Ink and IC-42-Cyan Ink produced by Seiko Epson Corporation were used to prepare an ink set.

Example 26

Yellow Ink Composition 26 was prepared in the same manner as in Example 3 except for changing the composition of the Yellow Ink Composition 3 which is the water dispersed material of high molecular vinyl polymer particles containing yellow pigment (Pig. 18) used in Example 3 into the following composition. Then image patterns were printed and evaluated for hue, print property and image fastness.

| | |
|---|---|
| Aforementioned water dispersion of pigment-containing high-molecular vinyl polymer particle | 30 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 23 parts by mass |

These components were mixed to obtain Yellow Ink Composition 26.

The pH of the ink composition was measured by a pH meter, WM-50EG, manufactured by DKK-TOA Corporation and found to be 8.7.

As for the magenta ink and cyan ink, IC-42-Magenta Ink and IC-42-Cyan Ink produced by Seiko Epson Corporation were used to prepare an ink set.

Example 27

Yellow Ink Composition 27 was prepared in the same manner as in Example 3 except for changing the composition of the Yellow Ink Composition 3 which uses aqueous yellow pigment dispersion used in Example 3 into the following composition. Then image patterns were printed and evaluated for hue, print property and image fastness.

| | |
|---|---|
| Aforementioned water dispersion of pigment-containing high-molecular vinyl polymer particle | 35 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 18 parts by mass |

These components were mixed to obtain Yellow Ink Composition 27.

The pH of the ink composition was measured by a pH meter, WM-50EG, manufactured by DKK-TOA Corporation and found to be 8.8.

As for the magenta ink and cyan ink, IC-42-Magenta Ink and IC-42-Cyan Ink produced by Seiko Epson Corporation were used to prepare an ink set.

Example 28

Yellow Ink Composition 28 was prepared in the same manner as in Example 3 except for changing the composition of the Yellow Ink Composition 3 which uses aqueous yellow pigment dispersion used in Example 3 into the following composition. Then image patterns were printed and evaluated for hue, print property and image fastness.

| | |
|---|---|
| Aforementioned water dispersion of pigment-containing high-molecular vinyl polymer particle | 40 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 13 parts by mass |

These components were mixed to obtain Yellow Ink Composition 28.

The pH of the ink composition was measured by a pH meter, WM-50EG, manufactured by DKK-TOA Corporation and found to be 8.8.

As for the magenta ink and cyan ink, IC-42-Magenta Ink and IC-42-Cyan Ink produced by Seiko Epson Corporation were used to prepare an ink set.

Example 29

Yellow Ink Composition 29 was prepared in the same manner as in Example 3 except for changing the composition of the Yellow Ink Composition 3 which uses aqueous yellow pigment dispersion used in Example 3 into the following composition. Then image patterns were printed and evaluated for hue, print property and image fastness.

| | |
|---|---|
| Aforementioned water dispersion of pigment-containing high-molecular vinyl polymer particle | 45 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |

-continued

| | |
|---|---|
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 8 parts by mass |

These components were mixed to obtain Yellow Ink Composition 29.

The pH of the ink composition was measured by a pH meter, WM-50EG, manufactured by DKK-TOA Corporation and found to be 8.9.

As for the magenta ink and cyan ink, IC-42-Magenta Ink and IC-42-Cyan Ink produced by Seiko Epson Corporation were used to prepare an ink set.

Example 30

Yellow Ink Composition 30 was prepared in the same manner as in Example 3 except for changing the composition of the Yellow Ink Composition 3 which uses aqueous yellow pigment dispersion used in Example 3 into the following composition. Then image patterns were printed and evaluated for hue, print property and image fastness.

| | |
|---|---|
| Aforementioned water dispersion of pigment-containing high-molecular vinyl polymer particle | 50 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |
| Ion-exchanged water | 3 parts by mass |

These components were mixed to obtain Yellow Ink Composition 30.

The pH of the ink composition was measured by a pH meter, WM-50EG, manufactured by DKK-TOA Corporation and found to be 9.0.

As for the magenta ink and cyan ink, IC-42-Magenta Ink and IC-42-Cyan Ink produced by Seiko Epson Corporation were used to prepare an ink set.

Example 31

Yellow Ink Composition 31 was prepared in the same manner as in Example 3 except for changing the composition of the Yellow Ink Composition 3 which uses aqueous yellow pigment dispersion used in Example 3 into the following composition. Then image patterns were printed and evaluated for hue, print property and image fastness.

| | |
|---|---|
| Aforementioned water dispersion of pigment-containing high-molecular vinyl polymer particle | 53 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 part by mass |
| Olfine E1010 (produced by Nissin Chemical Industry Co., Ltd.) | 1 part by mass |
| Water dispersion of Self-Dispersing Polymer Fine Particle (B-01) | 15 parts by mass |

These components were mixed to obtain Yellow Ink Composition 31.

The pH of the ink composition was measured by a pH meter, WM-50EG, manufactured by DKK-TOA Corporation and found to be 9.2.

As for the magenta ink and cyan ink, IC-42-Magenta Ink and IC-42-Cyan Ink produced by Seiko Epson Corporation were used to prepare an ink set.

Comparative Example 21

Comparative Yellow Ink Composition 21 was prepared in the same manner as in Example 1 except for using Azo Pigment Composition (C.I. Pigment Yellow 74) in place of Azo Pigment Composition (Pig. 1) used in Example 1. Then image patterns were printed and evaluated for hue, print property and image fastness.

Comparative Example 22

Comparative Yellow Ink Composition 22 was prepared in the same manner as in Example 25 except for replacing yellow pigment (Pig. 1) used in Example 25 with C.I. Pigment Yellow 74. Then image patterns were printed and evaluated for hue, print property and image fastness.

Comparative Example 23

Comparative Yellow Ink Composition 23 was prepared in the same manner as in Example 31 except for replacing yellow pigment (Pig. 1) used in Example 31 with C.I. Pigment Yellow 74. Then image patterns were printed and evaluated for hue, print property and image fastness.

Evaluations were conducted according to the aforementioned manners, Test Method for Hue, Evaluation of Coloring Power, Test Method for Light Fastness and Test Method for Ozone Gas Fastness. The results obtained are shown in Table 3.

TABLE 3

| Ink Composition (Ink Set) | Yellow pigment (solid content concentration) | Hue, single yellow color | Coloring Power, single yellow color | Light Fastness | | | Ozone Gas Fastness | | |
|---|---|---|---|---|---|---|---|---|---|
| | | | | Yellow | Red | Green | Yellow | Red | Green |
| Example 1 (yellow ink composition 1) | Pig. 1 (2.5 wt %) | A | B | A | A | A | A | B | B |
| Example 21 (yellow ink composition 21) | Pig. 1 (3.0 wt %) | A | B | A | A | A | A | B | B |

TABLE 3-continued

| Ink Composition (Ink Set) | Yellow pigment (solid content concentration) | Hue, single yellow color | Coloring Power, single yellow color | Light Fastness Yellow | Light Fastness Red | Light Fastness Green | Ozone Gas Fastness Yellow | Ozone Gas Fastness Red | Ozone Gas Fastness Green |
|---|---|---|---|---|---|---|---|---|---|
| Example 22 (yellow ink composition 22) | Pig. 1 (3.5 wt %) | A | A | A | A | A | A | B | B |
| Example 23 (yellow ink composition 23) | Pig. 1 (4.0 wt %) | A | A | A | A | A | A | B | B |
| Example 24 (yellow ink composition 24) | Pig. 1 (4.5 wt %) | A | A | A | A | A | A | A | A |
| Example 25 (yellow ink composition 25) | Pig. 1 (5.0 wt %) | A | B | A | A | A | A | A | A |
| Example 3 (yellow ink composition 3) | Pig. 18 (2.5 wt %) | A | A | B | A | A | A | B | B |
| Example 26 (yellow ink composition 26) | Pig. 18 (3.0 wt %) | A | A | B | A | A | A | B | B |
| Example 27 (yellow ink composition 27) | Pig. 18 (3.5 wt %) | A | A | B | A | A | A | B | B |
| Example 28 (yellow ink composition 28) | Pig. 18 (4.0 wt %) | A | A | A | A | A | A | B | B |
| Example 29 (yellow ink composition 29) | Pig. 18 (4.5 wt %) | A | A | A | A | A | A | A | B |
| Example 30 (yellow ink composition 30) | Pig. 18 (5.0 wt %) | A | A | A | A | A | A | A | B |
| Example 31 (yellow ink composition 31) | Pig. 18 (5.3 wt %) | A | B | A | A | A | A | A | B |
| Comparative Example 21 (Comparative Yellow Ink 21) | C.I. PY-74 (2.5 wt %) | A | B | D | D | D | B | C | D |
| Comparative Example 22 (Comparative Yellow Ink 22) | C.I. PY-74 (5.0 wt %) | A | A | D | D | D | B | C | D |
| Comparative Example 23 (Comparative Yellow Ink 23) | C.I. PY-74 (5.3 wt %) | A | B | D | D | D | B | C | D |

INDUSTRIAL APPLICABILITY

According to the present invention, an ink set excellent in the color reproducibility and light fastness over a wide range (a yellow single color region and a mixed color region such as red and green) is provided. Furthermore, a good recorded material ensuring that in addition to the colorability, fastness and preservability of the yellow single color part of an image on a recorded material printed using the ink set of the present invention, the hue, printing density and image fastness are improved at the same time in a high level also in the mixed color portion, particularly in the green color and red color parts where a yellow ink/a cyan ink and a yellow ink/a magenta ink are printed, can be formed.

This application is based on Japanese patent application JP 2008-335174, filed on Dec. 26, 2008, the entire content of which is hereby incorporated by reference, the same as if set forth at length.

The invention claimed is:

1. An ink set, comprising:
   a yellow ink composition containing a colorant; and
   at least one of a magenta ink composition and a cyan ink composition,
   wherein the colorant of the yellow ink composition contains an azo pigment represented by the following formula (1), a tautomer of the azo pigment, or a salt or hydrate thereof,
   the magenta ink composition contains at least one pigment selected from quinacridone pigments as a colorant, and
   the cyan ink composition contains at least one pigment selected from phthalocyanine pigments as a colorant:

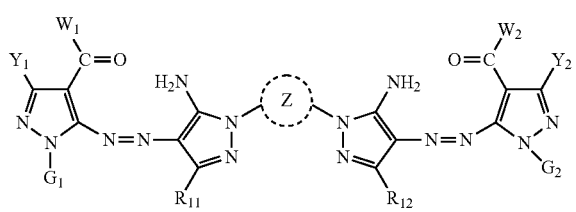

(1)

wherein Z represents atoms necessary to complete a 5- to 8-membered nitrogen-containing heterocycle;
$Y_1, Y_2, R_{11}$ and $R_{12}$ each independently represents a hydrogen or a substituent;
$G_1$ and $G_2$ each independently represents a hydrogen, an alkyl group, an aralkyl group, an alkenyl group, an alkynyl group, an aryl group or a heterocyclic group; and
$W_1$ and $W_2$ each independently represents an alkoxy group, an amino group, an alkyl group or an aryl group.

2. The ink set according to claim 1, further comprising a black ink composition,
   wherein the black ink composition contains carbon black as a colorant.

3. The ink set according to claim 1,
   wherein each of $W_1$ and $W_2$ in formula (1) is independently an alkoxy group having a total carbon number of 3 or less, an amino group or an alkylamino group having a total carbon number of 3 or less.

4. The ink set according to claim 1,
   wherein each of $G_1$ and $G_2$ in formula (1) is independently an alkyl group having a total carbon number of 3 or less.

5. The ink set according to claim 1,
   wherein Z in formula (1) is a 6-membered nitrogen-containing heterocycle.

6. The ink set according to claim 1,
wherein the azo pigment represented by formula (1) is an azo pigment represented by the following formula (2):

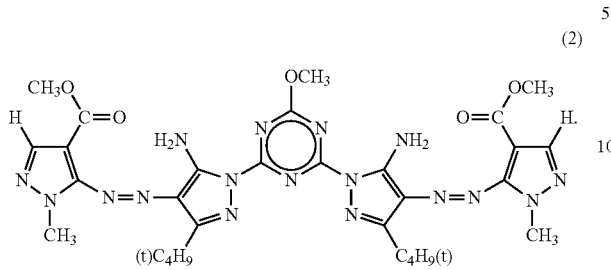

(2)

7. The ink set according to claim 6,
wherein the azo pigment represented by formula (2) or a tautomer of the azo pigment shows characteristic X-ray diffraction peaks at Bragg angles) (2θ±0.2° of 7.2° and 25.9° in the CuKα characteristic X-ray diffraction.

8. The ink set according to claim 1,
wherein the azo pigment represented by formula (1) is an azo pigment represented by the following formula (3):

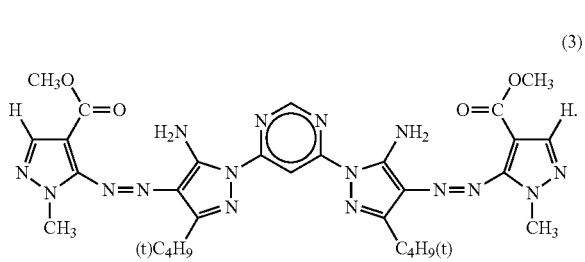

(3)

9. The ink set according to claim 8,
wherein the azo pigment represented by formula (3) or a tautomer of the azo pigment shows characteristic X-ray diffraction peaks at Bragg angles) (2θ±0.2° of 7.6°, 25.6° and 27.7° in the CuKα characteristic X-ray diffraction.

10. The ink set according to claim 1,
wherein an additive amount of each of the colorants is from 1 to 8 mass % based on each of the ink compositions.

11. The ink set according to claim 1,
wherein an additive amount of the colorant of the yellow ink composition is from 3 to 6 mass % based on the yellow ink composition.

12. The ink set according to claim 1,
wherein an additive amount of the colorant of the magenta ink composition is from 3 to 6 mass % based on the magenta ink composition.

13. The ink set according to claim 1,
wherein an additive amount of the colorant of the cyan ink composition is from 3 to 6 mass % based on the cyan ink composition.

14. The ink set according to claim 2,
wherein an additive amount of the colorant of the black ink composition is from 1 to 3 mass % based on the black ink composition.

15. The ink set according to claim 1,
wherein the ink compositions contain at least one of a dispersant and a penetrant.

16. The ink set according to claim 15,
wherein the dispersant is a high-molecular vinyl polymer particle.

17. The ink set according to claim 15,
wherein the penetrant is at least one of lower alkyl ethers of a polyhydric alcohol and acetylene glycols.

18. A recording method, comprising:
attaching an ink composition of the ink set according to claim 1 on a recording medium to perform printing.

19. The recording method according to claim 18, which is an inkjet recording method, comprising:
ejecting a liquid droplet of the ink composition and attaching the liquid droplet on a recording medium to perform printing.

20. A recorded material printed by the recording method according to claim 18.

* * * * *